United States Patent [19]

Wu

[11] 4,297,417
[45] Oct. 27, 1981

[54] PHOTOSENSITIVE COLORED GLASSES EXHIBITING ALTERABLE PHOTO-ANISOTROPIC EFFECTS

[75] Inventor: Che-Kuang Wu, Horseheads, N.Y.
[73] Assignee: Corning Glass Works, Corning, N.Y.
[21] Appl. No.: 86,589
[22] Filed: Oct. 19, 1979

Related U.S. Application Data

[62] Division of Ser. No. 924,508, Jul. 14, 1978, Pat. No. 4,191,547.

[51] Int. Cl.$^3$ .................. B32B 17/00; G02F 3/00
[52] U.S. Cl. ............................ 428/410; 501/69;
346/135.1; 350/354; 350/362; 350/398;
350/406; 430/19; 430/346; 430/495; 430/962;
428/913
[58] Field of Search .................. 106/DIG. 6, 52;
350/354, 398, 406, 362; 430/346, 19; 346/135.1;
428/428, 410, 913

[56] References Cited

U.S. PATENT DOCUMENTS

| | | | |
|---|---|---|---|
| 3,540,793 | 11/1970 | Aravjo | 350/398 |
| 4,125,404 | 11/1978 | Aravjo et al. | 106/54 |
| 4,160,654 | 7/1979 | Bartholomew et al. | 65/30 E |
| 4,191,547 | 3/1980 | Wu | 65/30 R |

Primary Examiner—Helen M. McCarthy
Attorney, Agent, or Firm—Clinton S. Janes, Jr.

[57] ABSTRACT

This invention is concerned with hydrated glass articles having base compositions within the $Na_2O$ and/or $K_2O$-$ZnO$-$Al_2O_3$-$SiO_2$-Cl field and having at least a surface layer thereon containing Ag-AgCl crystals which impart photo-anisotropic effects to the glass articles. Silver ions are introduced into the surface layer through a solution ion exchange process with sodium and/or potassium ions of the parent glass. The silver remains in the ionic state until exposure to ultraviolet radiation which results in the development of silver-containing aggregates, i.e., Ag-AgCl, via a photolytic reaction. The aggregates contribute to photo-anisotropic absorption bands which are centered around 340 nm and 700 nm. Polarization of the photo-dichroic and photo-birefringent effects of the inventive products can be altered reversibly between two arbitrary directions without fatigue. The photo-anisotropic image can be read cyclically essentially indefinitely without destruction. The product of the invention is eminently suitable as a photosensitive medium for storing optical information.

2 Claims, 14 Drawing Figures

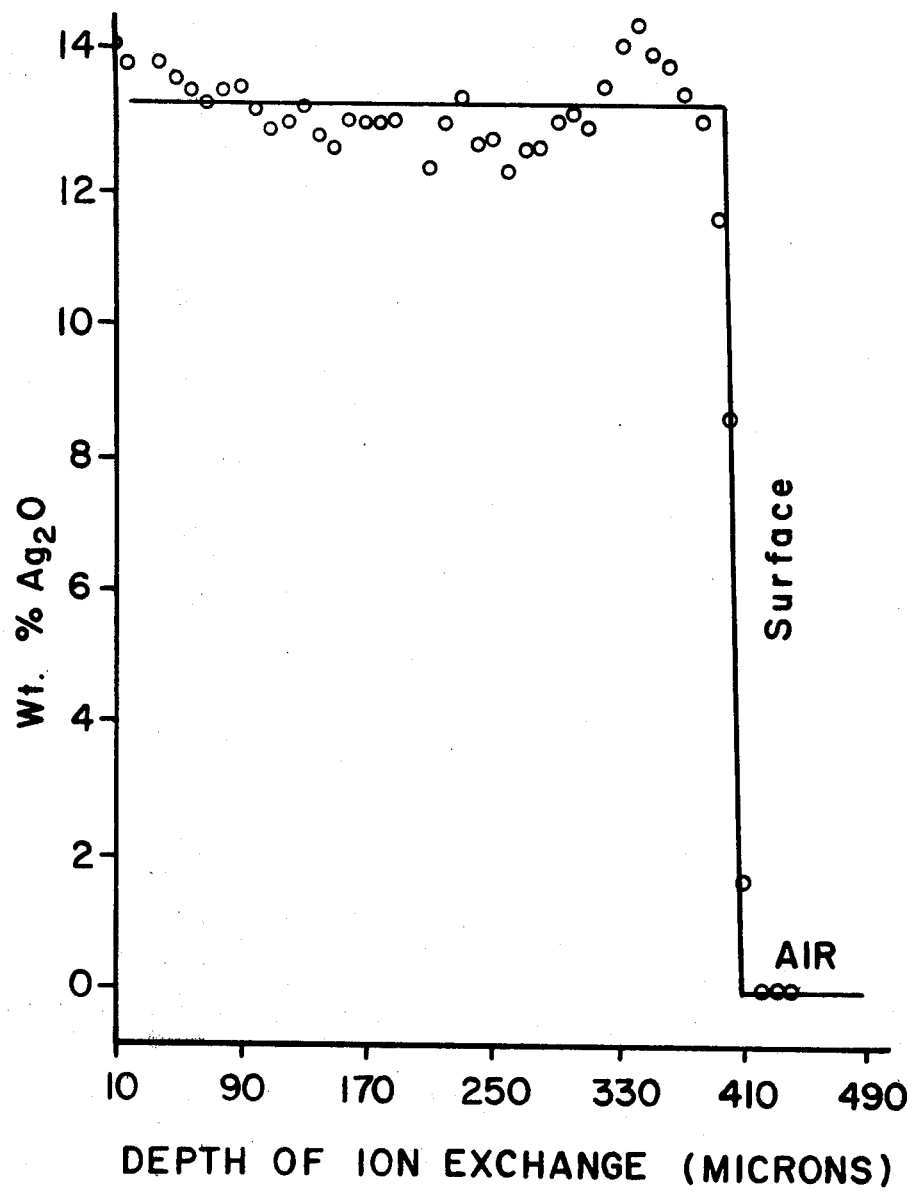
Fig. IA

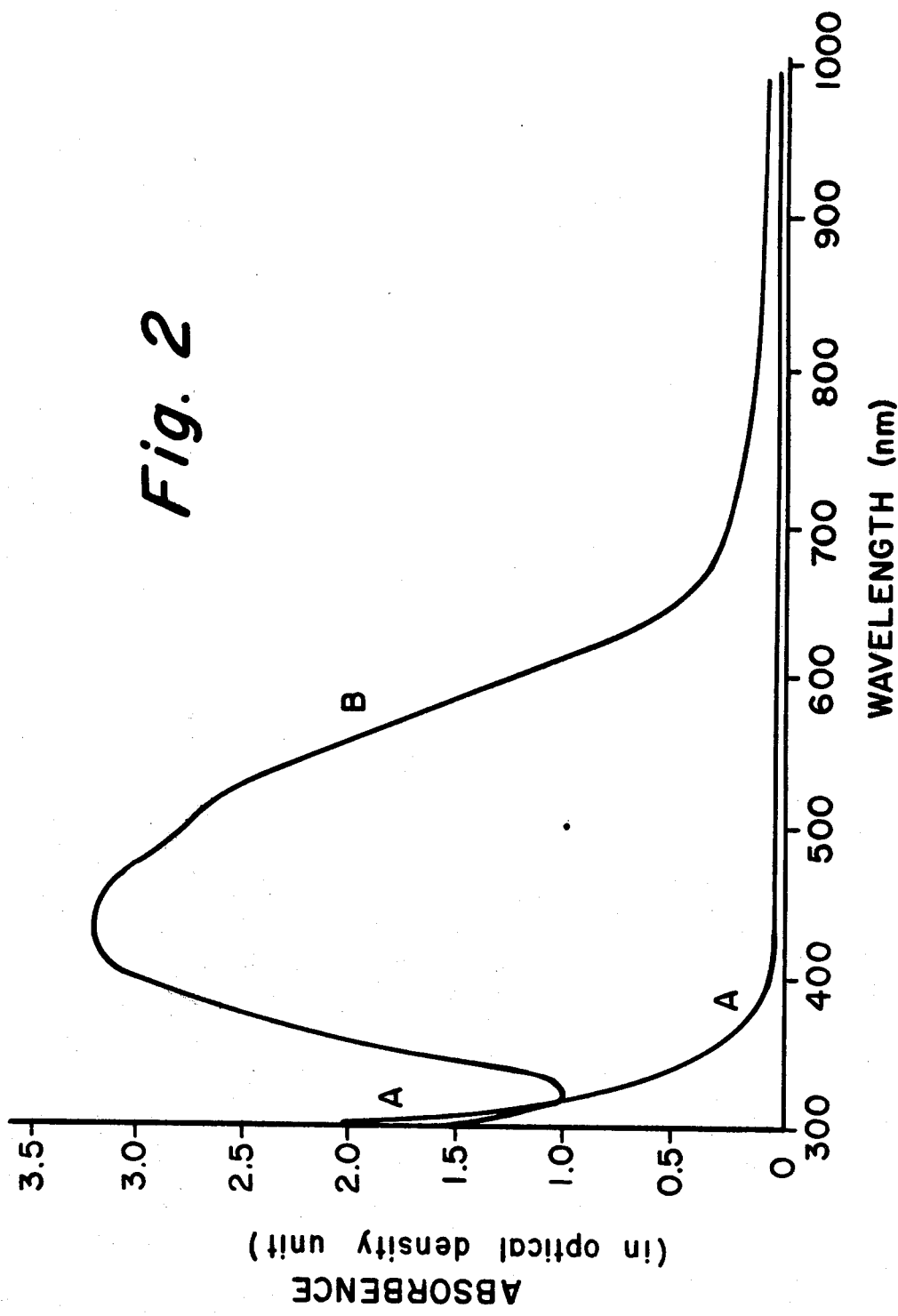

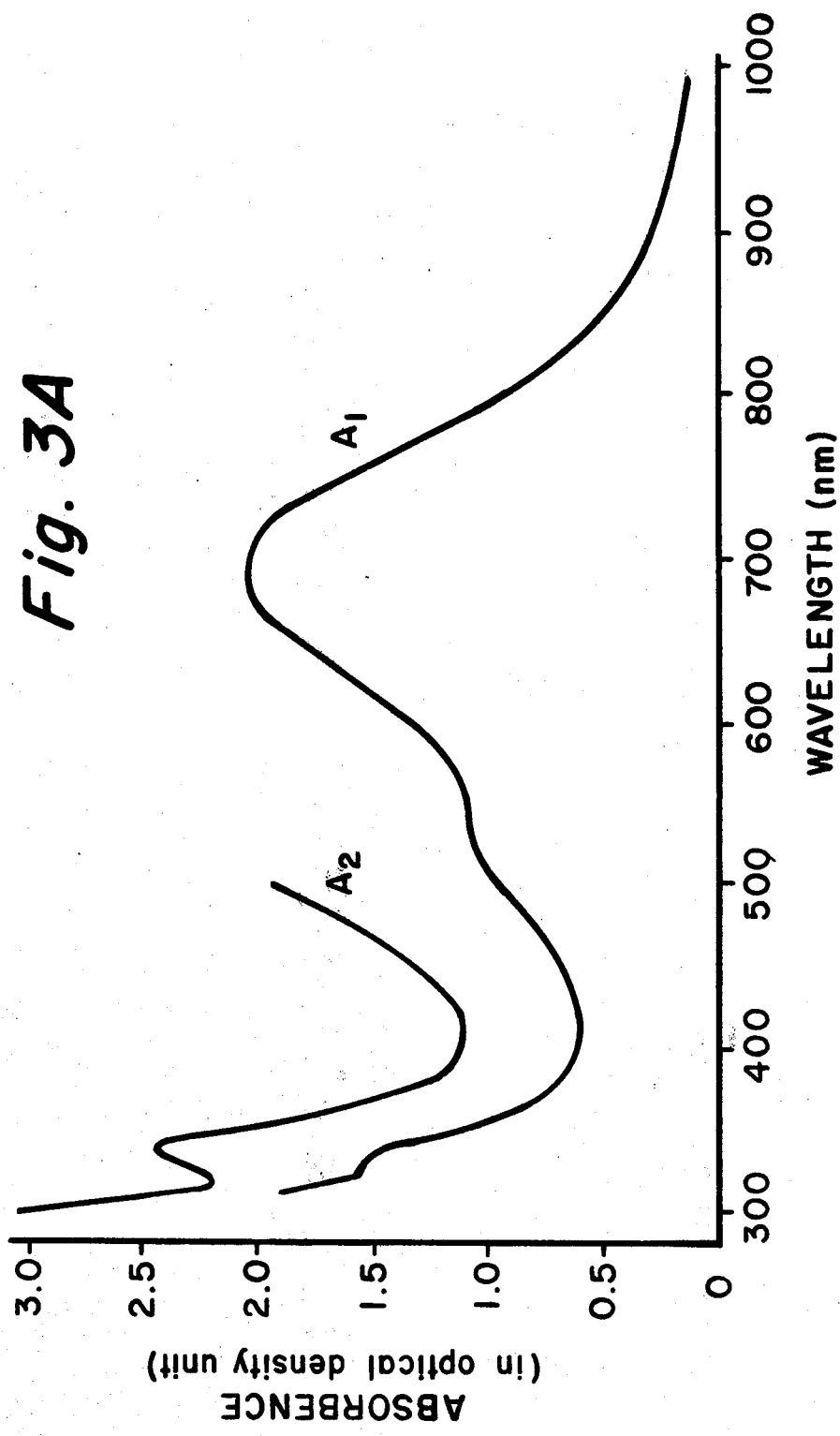

4,297,417

PHOTOSENSITIVE COLORED GLASSES EXHIBITING ALTERABLE PHOTO-ANISOTROPIC EFFECTS

This is a division of application Ser. No. 924,508, filed July 14, 1978, now U.S. Pat. No. 4,191,547.

BACKGROUND OF THE INVENTION

U.S. Application Ser. No. 844,783, filed Oct. 25, 1977 in the names of Bartholomew, Mach, and Wu, now U.S. Pat. No. 4,160,654, discloses the preparation of hydrated silver-containing glass articles which exhibit photosensitive characteristics. Glasses suitable for that invention consist essentially, on the anhydrous basis in mole percent, of about 3–25% $Na_2O$ and/or $K_2O$ and 50–95% $SiO_2$, the sum of those components constituting at least 55% of the total composition, and about 0.1–3% total of a halide selected from the group of $F^-$, $Cl^-$, $Br^-$, and $I^-$. Such glasses are contacted either concurrently with the hydration step or subsequently thereto with an aqueous solution containing silver ions to cause an exchange of silver ions for sodium and/or potassium ions in the surface of the glass to occur accompanied with a reaction of silver ions with halide ions to form silver halide crystals.

Where the hydration and ion exchange are undertaken concurrently, the anhydrous glass is contacted with an aqueous silver ion-containing solution having a pH less than 4 at a temperature in excess of 100° C. and at a pressure in excess of 20 psig for a sufficient length of time to hydrate at least a surface portion on the glass article and cause the replacement of sodium and/or potassium ions with silver ions in the hydrated glass.

Where the hydration and ion exchange are conducted sequentially, the anhydrous glass is initially exposed to a $H_2O$-containing gaseous environment having a relative humidity of at least 75% at a temperature of at least 100° C. for a sufficient length of time to develop at least a surface portion on the article which is essentially saturated. Thereafter, the article is subjected to a gaseous environment wherein the relative humidity is less than 90% of that employed in the hydration step for a sufficient length of time to reduce the $H_2O$ content at least within the surface portion but leaving an amount therein effective to impart thermoplastic properties thereto. Finally, the hydrated glass article is contacted with an aqueous silver ion-containing solution having a pH less than 5 at a temperature in excess of 100° C. for a sufficient length of time to cause the replacement of sodium and/or potassium ions with silver ions in the hydrated glass.

The preferred glass composition regions were reported as consisting essentially, on the anhydrous basis in mole percent, of about 70–82% $SiO_2$, 10–17% $Na_2O$ and/or $K_2O$, 5–15% ZnO and/or PbO, 0.5–5% $Al_2O_3$, and 0.5–3% halide. $Cl^-$ is the most desirable halide in amounts of about 0.1–3%. It was observed that 0.001–0.1 mole percent of a sensitizing agent such as CuO and/or $CeO_2$ is advantageously included.

The products resulting from those inventive methods commonly exhibit a yellowish hue, the coloration becoming progressively darker as the silver ion concentration in the aqueous ion exchange solution is increased. Thus, the specification observes that the effect of utilizing greater silver ion concentrations in the ion exchange solution is to promote the extent of ion exchange reaction which leads to the development of a darker amber color.

The prior art relating to photosensitive and photochromic glasses has indicated that the quantity of silver must be held to a very low value to insure the formation of a transparent glass, as opposed to a translucent or opaque glass. Hence, for example, the silver content of the transparent photosensitive glasses of U.S. Pat. No. 2,515,936 will be held below 0.3% by weight, the silver content of the transparent photochromic glasses of U.S. Pat. No. 3,208,860 will be less than 0.7% by weight, and the silver content of the transparent photosensitive colored glasses of U.S. Pat. No. 4,017,318 will be maintained below 0.1%. In general, the maximum limits of allowable silver ion concentration in those transparent glasses, wherein the desired phenomenon is founded in the photosensitivity of silver, are a function of the redox state of the glasses, this circumstance being governed by oxygen ion acitivity which, in turn, is related to the quantities of thermoreducing and photoreducing agents in the glass. Thus, the amount of silver ion permissible in such transparent glasses is ordinarily not limited by the intrinsic solubility of silver ion in the base glass composition.

When the upper limit of silver ion concentration is approached in the glasses cited immediately above, the oxidation state of silver, i.e., the fraction of silver present as $Ag^+$, becomes hypersensitive to the redox state of the glass. Consequently, the atmosphere of the melting tank, the melting temperature, impurities in the batch, e.g., organic contaminants from the sand, the temperature of heat treatment to develop silver halide crystals in photochromic glasses, and the temperatures of heat treatments to develop NaF-silver halide crystals in photosensitive colored glasses are well known to affect the behavior and physical properties of the final products. Moreover, in each case, the presence of any spontaneous warm-in silver may destroy or suppress the desired effects.

SUMMARY OF THE INVENTION

The instant invention provides photosensitive colored glasses exhibiting photo-anisotropic effects, viz., photodichroic and photo-birefringent effects. Polarization of those two effects can be reversibly altered between two arbitrarily chosen directions without apparent fatigue, i.e., the effects can be reversibly altered seemingly indefinitely with no adverse results. The foundation of the invention is the finding that up to 25% by weight of silver can be introduced into a thin surface layer, i.e., no more than about 500 microns thick, in certain hydrated glass bodies of specified compositions within the $Na_2O$ and/or $K_2O$-ZnO-$Al_2O_3$-$SiO_2$-Cl system via an aqueous solution ion exchange process. It appears that all or substantially all of the silver present in the thin, ion exchanged surface layer is present in the ionic state. This phenomenon is evidenced from the transparent, colorless, water white appearance of the integral surface layer developed on the glasses through the ion exchange reaction. FIGS. 1A, 1B, and 1C illustrate profiles of silver concentration generated by electron microprobe analyses, the data being fitted with a step function. Each sample appeared to be visually colorless and transparent.

FIG. 1A depicts the concentration of silver in a ribbon sample of about 400 micron thickness of exemplary composition 1 of Table I, infra, which had been ion exchanged completely therethrough via immersion into an aqueous solution consisting of 20 grams $AgNO_3 + 10$ ml of 16N $HNO_3$/liter for eight hours at 320° C. The ion exchange reaction was carried out in an autoclave in such a manner that the pressure therein was somewhat below 1650 psig.

FIG. 1B represents the concentration of silver in the surface of a ground and polished 2 mm thick plate sample of exemplary composition 2 of Table I, infra, which has been immersed into an aqueous solution consisting of 20 grams $AgNO_3 + 1$ ml of 16N $HNO_3$/liter for two hours at 300° C. The ion exchange reaction was conducted in an autoclave in such a manner that the pressure therein was about 1200 psig.

FIG. 1C sets forth the concentration of silver in the surface of a ground and polished 2 mm thick plate sample of exemplary composition 3 of Table I, infra, which had been immersed into an aqueous solution consisting of 20 grams $AgNO_3 + 10$ ml of 16N $HNO_3$/liter for two hours at 250° C. The ion exchange reaction was undertaken in an autoclave with a pressure of about 550 psig.

FIG. 2 represents the general absorption spectrum of the solution ion exchanged products of the instant invention.

FIG. 3A illustrates the general absorption curve displayed by the products of the present invention after being darkened by ultraviolet radiation. The three dominant absorption bands appear at about 340 nm, 520 nm, and 700 nm. The absorption bands at 340 nm and 700 nm are referred to herein as the photo-anisotropic bands and the 520 nm band as the photochromic band, the rationale for those designations being explained hereinafter.

Only a limited fraction of the silver aggregates formed upon exposure of the products of the instant invention to ultraviolet radiation contributes to the photochromic band. Rather, the large majority thereof contributes to the photo-anisotropic bands. Thus, the method of the instant invention gives rise to the phenomenon that all or substantially all of the silver aggregates created upon ultraviolet exposure are of a photo-anisotropic type. Consequently, the ultraviolet-darkened, thin surface layer developed by the inventive method can display various shades of blue coloration ranging from greenish-blue, through saturated blue, to purple due to the strong absorption in the red portion of the spectrum. This absorption peaks at wave lengths between 650–800 nm, depending upon glass composition and processing parameters. Furthermore, the intensity of the blue coloration, i.e., the optical density in the red portion of the spectrum, is proportional to the energy density of the ultraviolet exposure.

Inasmuch as the inventive glasses are not darkened under conventional indoor lighting and are resistant to thermal fading, the thin ion exchanged layer may be darkened to any desired degree and will remain at that value of optical density for an indefinite period of time. A further exposure to intense ultraviolet radiation, however, can alter the optical density of the glass. Finally, since up to 25% by weight of silver can be present in the ion exchanged surface having a thickness of about 1–500 microns, very high optical densities are readily obtainable, e.g., greater than 40 db at the wavelength of the absorption peak. This phenomenon is demonstrated in FIG. 3B.

FIG. 3B graphically sets forth the optical density exhibited by a ground and polished 2 mm thick plate sample of exemplary composition 37 of Table I, infra, after immersion into an aqueous solution consisting of 200 grams $LiNO_3 + 20$ grams $AgNO_3 + 7.5$ ml of 16N $HNO_3$/liter conducted for six hours at 320° C. in an autoclave operating at about 1600 psig. The plate was darkened in three areas to three levels of optical density by utilizing a 2500 watt HgXe arc for periods of 40 minutes, 3.5 hours, and 22 hours. Investigation has shown that about 90% of the optical density reported in curves A, B, and C is contributed from photo-dichroic layers of less than about 20, 30, and 50 microns, respectively. The depth of the solution ion exchanged layer, i.e., the layer made photosensitive via the infusion of $Ag^+$ ions, was measured to be about 98 microns. FIG. 3B points up that the optical density of the photo-anisotropic absorption bands increases and the absorption peak at around 700 nm is blue shifted as the exposure to ultraviolet radiation is extended.

The blue coloration, i.e., absorption in the red portion of the spectrum, exhibited by the surface layer can be bleached out utilizing a moderately intense, linearly-polarized light having a wavelength near the 700 nm band, this action concomitantly resulting in the creation of a photo-anisotropic effect. FIG. 4 illustrates the transmittance spectra of a 2 mm thick plate sample of exemplary composition 32, Table I, infra, which has been immersed for six hours at 320° C. in an aqueous solution consisting of 20 grams $AgNO_3 + 10$ ml of 16N $HNO_3 + 200$ grams $LiNO_3$/liter, the solution being saturated with silica gel. The bleaching was carried out by a polarized red light having a wavelength of 647 nm. The curve labeled $T_{\parallel}$ represents the transmittance of the glass in the polarization direction parallel to that of the bleaching beam. The curve marked $T_\perp$ designates the transmittance of the glass in the polarization direction perpendicular to that of the bleaching beam. $T_{ave}$ represents the average values of $T_{\parallel}$ and $T_\perp$. The spectrum of the original blue colored surface layer is set forth in the dashed curve ($T_o$). It has been found that the transmittance of the original blue colored surface layer ($T_o$) can be monitored with the energy density of the ultraviolet radiation, and that the separation of the $T_{\parallel}$ and $T_\perp$ curves can be monitored via the energy density of the polarizing light.

As can be seen from FIG. 4, the absorption around the 750 nm band, after bleaching in the polarization direction parallel to that of the bleaching beam, is less than the absorption in the polarization direction perpendicular to that of the bleaching beam. In contrast, the absorption around the 340 nm band, after bleaching in the polarization direction parallel to that of the bleaching beam, is greater than the absorption in the perpendicular direction. A comparison of the $T_o$ curve with the $T_{ave}$ curve in FIG. 4 makes evident that, whereas the absorption in the red portion of the spectrum is bleached with polarized red light, the integrated absorption over the wave length region of the three absorption bands is not lessened. As will be explained hereinafter, this is one of the fundamental properties of the products of the instant invention which permits reversibility without fatigue of the observed effects of photo-anisotropy.

It was explained above that the absorption bands around 340 nm and 700 nm are referred to as the photo-anisotropic absorption bands, photo-anisotropy including both photo-dichroism and photo-birefringence. A wavelength dependent birefringence, $n_{\parallel} - n_\perp$, associated with the dichroic absorption is measurable and is related to the dichroic absorption through the well-known Kramers-Kronig Dispersion Relation. It is postulated that both the 340 nm and 700 nm absorption bands originate from the same color center, i.e., an anisotropic color center. The color center is hypothesized to consist of aggregates of silver atoms or specks of molecular dimensions or very minute silver particles on the surface of AgCl or AgCl-containing crystals which are formed during the solution ion exchange reaction. The aggregates which are formed during ultraviolet exposure may be pictured as granular silver films on the surface of silver halide crystals if they are not continuous. A continuous aggregate is simply an oblate particle. Under the influences of a bleaching beam, regrouping and/or relocation of the silver particles take place; i.e., the aggregates of silver particles are either relocated or changed in shape.

Bleaching with polarized light induces an optically anisotropic state which is manifested via the phenomena of birefringence and dichroism. This optically-induced anisotropy, coupled with a high resolution capability resulting from the fine-grained nature of the photo-dichoric layer developed by the inventive method, suggest the utility of these materials for optical recording. The bleaching resistivity, or the energy density demanded to create a sufficient dichroic absorption difference for reading, is an important parameter which must be considered for such an application.

Glass compositions operable in the present invention consist essentially, in mole percent on the oxide basis, of about 70–82% $SiO_2$, 10–17% $Na_2O$ and/or $K_2O$, 5–15% ZnO, 0.5–5% $Al_2O_3$, and 0.1–3% Cl. The hydration and ion exchange reactions will be carried out in an aqueous solution of a silver salt containing an acid, customarily a mineral acid, such as to exhibit a pH below 2. The preferred solutions will contain $AgNO_3$ as the silver salt and $HNO_3$ as the acid component. Although concentrated aqueous solutions of silver salts are operable, the properties demonstrated by the final products are not substantially removed from those obtained through the use of dilute solutions. Accordingly, whereas silver ion concentrations of about 10% by weight and higher are effective, concentrations below about 0.1% are also operable. In summary, suitable solutions will have a pH less than 2 (equivalent to a $[Ag^+]$ concentration of more than 0.01% by weight) and contain $AgNO_3$ and $HNO_3$ in amounts sufficient to provide a mole ratio $[Ag^+]:[H^+]$ within the levels of about 0.37–1.85. The most preferred solutions will exhibit a pH less than 1.

The hydration ion exchange reactions will be conducted at temperatures in excess of 200° C. and at pressures of at least 200 psig. More desirably, the reactions will be undertaken at temperatures higher than 250° C. Because an autoclave permits relatively easy control of temperature, pressure, and surrounding environment, the reactions will customarily be conducted in such an apparatus. As a matter of convenience, the maximum reaction temperature employed will be restricted to 374° C., the critical temperature of water. (The critical pressure of water is about 3200 psig.) The most preferred temperatures lie between about 300°–320° C.

The rate of water migration into the glass and the rate of the ion exchange reaction are dependent upon the temperatures employed, the composition of the glass, and the depth of hydrated layer desired. Consequently, whereas times as short as 5 minutes may suffice in some instances, longer terms, e.g., two-eight hours, will be required to obtain a silver-containing layer of 50–200 microns thickness. Much longer times, i.e., up to 48 hours and longer, may be used where necessary. With the compositions of the instant invention, the maximum water content of the hydrated layer will not exceed about 10% by weight, with 1–8% constituting normal amounts.

In summary, then, the inventive method provides a photosensitive colored glass exhibiting photo-anisotropic effects consisting of a body portion and an integral surface layer thereon having a thickness of about 1–500 microns, at least a portion of which exhibits photo-dichroic and birefringent properties. The method consists of the following general procedure:

An anhydrous glass body consisting essentially, in mole percent on the oxide basis, of about 70–82% $SiO_2$, 10–17% $Na_2O$ and/or $K_2O$, 5–15% ZnO, 0.5–5% $Al_2O_3$, and 0.1–3% Cl is contacted with an aqueous solution containing $Ag^+$ ions and acidified with a mineral acid to a pH less than about 2, this contact being made at a temperature in excess of 200° C. and at a pressure in excess of 225 psig. for a period of time sufficient to hydrate a surface layer thereon and to cause the replacement of $Na^+$ and/or $K^+$ ions with $Ag^+$ ions in said hydrated glass, the proportion of $Na^+$ and/or $K^+$ ions in said hydrated glass being less with a corresponding increase in $Ag^+$ and/or $H^+$ (or $H_3O^+$) ions. The $Ag^+$ ions react with $Cl^-$ ions in the hydrated glass to effect the formation of Ag-AgCl-containing crystals, thereby rendering the glass photosensitive.

Up to about 25% by weight silver can be incorporated into the hydrated glass structure, the amount so incorporated being a function of the $Na_2O$ and/or $K_2O$ level in the glass composition. Generally, the silver present in the surface layer will range up to about 25% by weight, with contents of about 2–20% appearing to produce the maximum photo-anisotropic effects.

Thereafter, the hydrated photosensitive surface layer was exposed to ultraviolet radiation at an intensity and for a time sufficient to impart photo-anisotropic properties thereto. Depending upon the thickness of the surface layer and the depth desired, this exposure time can vary from as little as 0.25 hour up to, perhaps, 120 hours.

BRIEF DESCRIPTION OF THE DRAWINGS

FIG. 1A graphically represents the concentration of silver in a glass ribbon sample.

FIG. 3A graphically records the generally absorption spectrum of the inventive product after exposure to ultraviolet radiation.

DESCRIPTION OF PREFERRED EMBODIMENTS

Figure 1B:
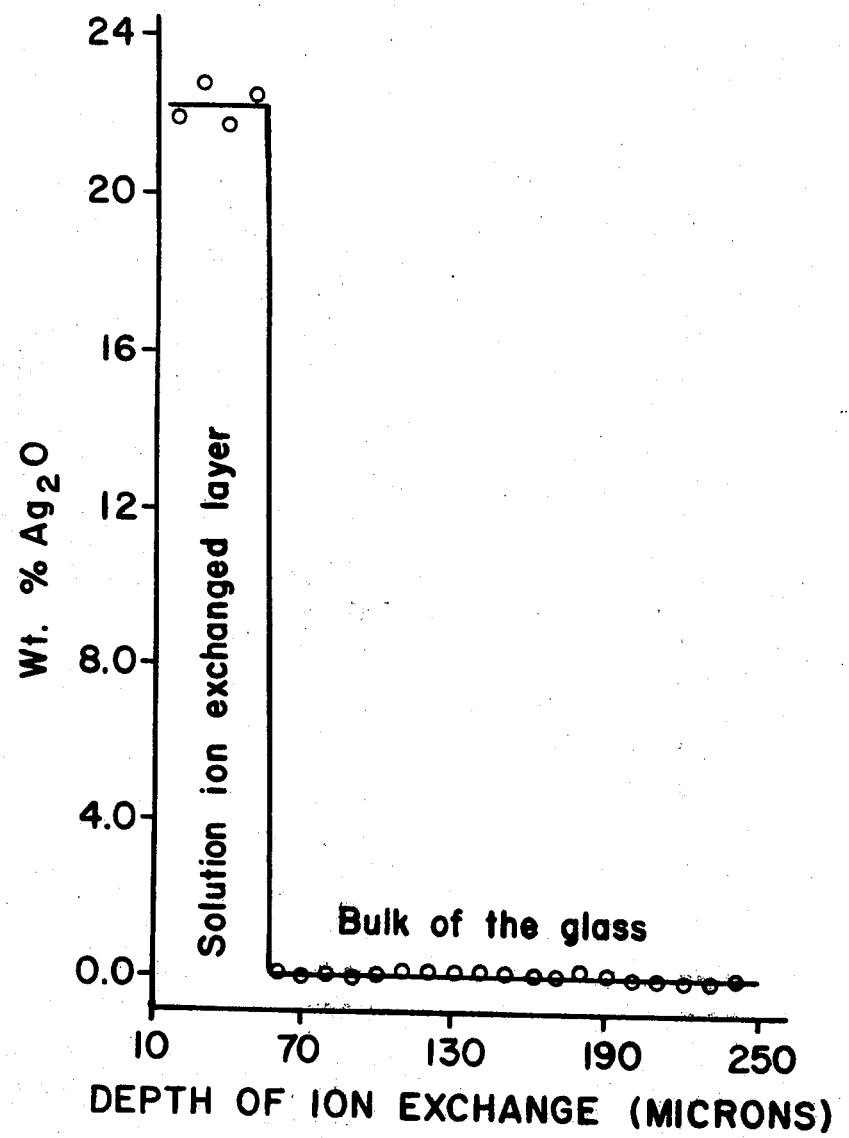
FIG. 1B graphically reports the concentration of silver in the surface of a glass plate sample.
Figure 1C:
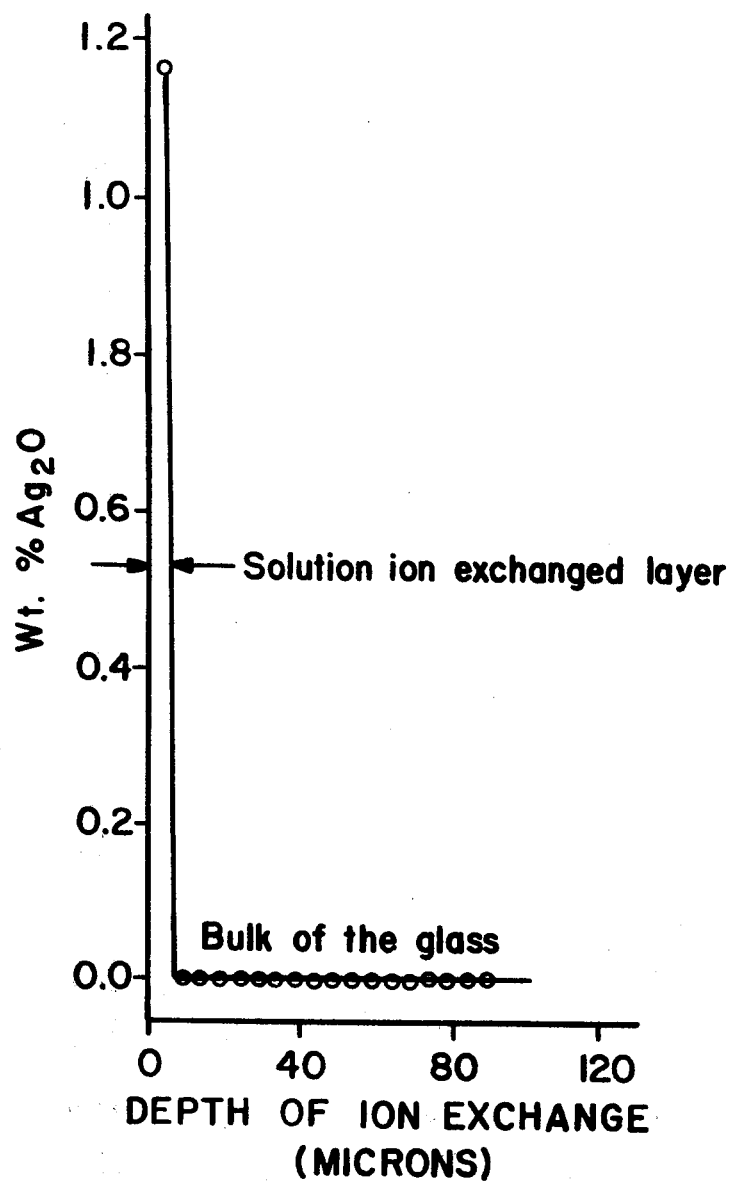
FIG. 1C graphically sets forth the concentration of silver in the surface of a glass plate sample.
Figure 2:
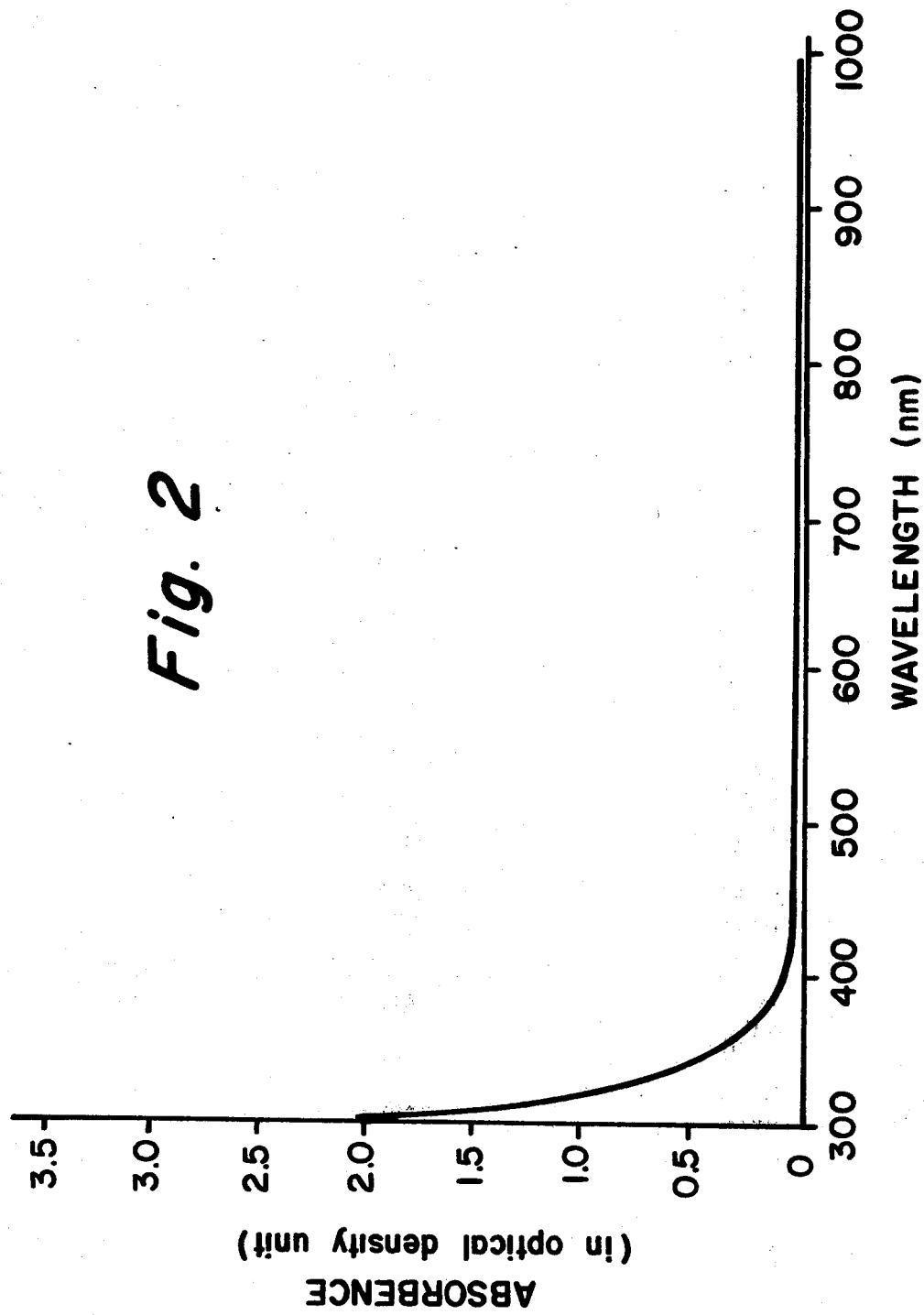
FIG. 2 graphically portrays the general absorption spectrum of an inventive product after solution ion exchange reaction and prior to exposure to ultraviolet radiation.

Table I lists several batch compositions, expressed in approximate weight percent on the oxide basis, illustrating the parameters of the instant invention. The compositions are stated to be in approximate weight percent since the proportions cited reflect direct calculations from weight percent of the batch ingredients, e.g., $Na_2O$ from $Na_2CO_3$, and the values have not been normalized to a basis of 100%. Nevertheless, the sum of the individual ingredients so closely approaches 100 that, for practical purposes, the amounts recorded can be deemed to represent weight percents. The halides are reported as F, Cl, and Br, in accordance with practice conventional in the glass art, inasmuch as it is not known with which cation(s) each is combined. The $NO_2$ component was derived from nitrate materials, commonly alkali metal nitrate. The actual batch ingredients can comprise any materials, either the oxide or other compound, which, when melted together with the remainder of the constituents, will be converted into the desired oxide in the proper proportions. The halides were commonly included in alkali metal-containing compounds.

The compositions recited in Table I reflect laboratory melt,s although it will be recognized that much larger quantities of glass could be prepared in pots or continuous melting tanks. However, in the laboratory melts the batches were compounded, deposited into platinum crucibles, the crucibles were covered, and then placed in a furnace operating at 1400°–1650° C. The batches were melted for 4–16 hours, some melts being stirred and others not being stirred, and then poured into patties having dimensions of about $4'' \times 4'' \times 1''$. The patties were immediately transferred to an annealer operating at about 460°–600° C. Where glass of optical quality is to be produced from commercial continuous-melting tanks, stirring of the melt will be conventionally employed.

TABLE I

| | 1 | 2 | 3 | 4 | 5 | 6 | 7 | 8 | 9 |
|---|---|---|---|---|---|---|---|---|---|
| $SiO_2$ | 73.05 | 72.97 | 73.06 | 73.19 | 72.96 | 72.99 | 73.18 | 73.17 | 72.00 |
| $Na_2O$ | 10.38 | 10.50 | 10.39 | 10.23 | 10.50 | 10.48 | 10.23 | 10.25 | 11.24 |
| ZnO | 9.98 | 9.96 | 9.98 | 9.99 | 9.96 | 9.97 | 9.99 | 9.99 | 9.83 |
| $K_2O$ | 4.52 | 4.51 | 4.52 | 4.53 | 4.51 | 4.51 | 4.53 | 4.52 | 4.90 |
| $Al_2O_3$ | 2.06 | 2.06 | 2.06 | 2.06 | 2.06 | 2.06 | 2.06 | 2.06 | 2.03 |
| CuO | 0.01 | — | — | — | 0.01 | — | 0.01 | — | — |
| Cl | 0.156 | 0.2 | 0.157 | 0.162 | 0.20 | 0.151 | 0.162 | 0.21 | 0.202 |
| F | 0.149 | — | 0.149 | 0.150 | — | 0.149 | 0.15 | — | — |
| $NO_2$ | 0.64 | — | 0.64 | 1.28 | — | — | 1.28 | 1.28 | 0.64 |

| | 10 | 11 | 12 | 13 | 14 | 15 | 16 | 17 | 18 |
|---|---|---|---|---|---|---|---|---|---|
| $SiO_2$ | 71.07 | 73.39 | 73.24 | 73.26 | 73.01 | 72.02 | 73 | 73 | 73 |
| $Na_2O$ | 11.95 | 10.02 | 10.16 | 10.14 | 10.40 | 11.21 | 10.5 | 10.5 | 10.5 |
| ZnO | 9.70 | 9.98 | 10.00 | 10.00 | 9.97 | 9.84 | 10 | 10 | 4.5 |
| $K_2O$ | 5.27 | 4.54 | 4.53 | 4.53 | 4.52 | 4.90 | 4.5 | 4.5 | 10 |
| $Al_2O_3$ | 2.00 | 2.07 | 2.07 | 2.06 | 2.06 | 2.03 | 2 | 2 | 2 |
| CuO | — | — | — | 0.01 | — | — | — | — | — |
| Cl | 0.152 | 0.172 | 0.216 | 0.162 | 0.151 | 0.154 | 0.5 | 1.5 | 2.5 |
| F | 0.145 | 0.150 | — | 0.15 | 0.298 | 0.147 | — | — | — |
| $NO_2$ | 0.64 | 2.56 | 1.92 | 1.28 | — | 0.64 | — | — | — |

| | 19 | 20 | 21 | 22 | 23 | 24 | 25 | 26 | 27 |
|---|---|---|---|---|---|---|---|---|---|
| $SiO_2$ | 73 | 73 | 73 | 45.8 | 72 | 72 | 59.1 | 58.7 | 73 |
| $Na_2O$ | 10.5 | 10.5 | 10.5 | 3.4 | 16.2 | 16.2 | 9.54 | 9.7 | 10.5 |
| ZnO | 10 | 10 | 10 | — | 5 | 5 | — | — | 10 |
| $K_2O$ | 4.5 | 4.5 | 4.5 | 5.7 | — | — | — | — | 4.5 |
| $Al_2O_3$ | 2 | 2 | 2 | 2 | 2 | 2 | — | — | 2 |
| CuO | — | 0.01 | 0.01 | — | — | — | 0.02 | 0.02 | 0.05 |
| Cl | — | — | 0.05 | 0.02 | — | — | 1.04 | 1.05 | 1 |
| F | 2.5 | 0.1 | 0.05 | — | 2.5 | 2.5 | — | 1.05 | — |
| Br | — | — | — | — | 1.1 | — | — | — | — |
| PbO | — | — | — | 42.8 | — | — | 31.2 | 31.5 | 10 |
| $Sb_2O_3$ | — | — | — | — | 1 | 1 | — | — | — |
| SnO | — | — | — | — | 0.04 | 0.04 | — | — | — |
| $CeO_2$ | — | — | — | — | 0.05 | 0.05 | — | — | — |
| Ag | — | — | — | — | 0.01 | 0.01 | — | — | — |
| I | — | — | — | — | — | 1.1 | — | — | — |

| | 28 | 29 | 30 | 31 | 32 | 33 | 34 | 35 | 36 | 37 | 38 |
|---|---|---|---|---|---|---|---|---|---|---|---|
| $SiO_2$ | 73 | 58.3 | 73 | 72.97 | 73.0 | 73.0 | 73.0 | 73.0 | 72.84 | 71.4 | 71.7 |
| $Na_2O$ | 10.5 | 9.8 | 10.5 | 10.50 | 10.47 | 0.5 | 10.5 | 10.5 | 10.58 | 11.5 | 11.1 |
| ZnO | 10 | — | 10 | 9.96 | 9.97 | 10.5 | 10.0 | 10.0 | 9.94 | 9.7 | 9.8 |
| $K_2O$ | 4.5 | — | 4.5 | 4.51 | 4.51 | 4.5 | 4.5 | 4.5 | 4.50 | 5.3 | 5.3 |
| $Al_2O_3$ | 2 | — | 2 | 2.06 | 2.06 | 2.0 | 2.0 | 2.0 | 2.05 | 2.0 | 2.0 |
| CuO | 0.05 | 0.02 | 0.1 | — | — | — | 0.01 | — | — | — | — |
| Cl | 1.5 | 2.1 | 0.15 | 0.235 | 0.186 | — | 0.1 | — | 0.397 | 1.23 | 1.83 |
| F | 1.5 | 1.06 | 0.1 | — | 0.149 | — | — | 0.125 | 0.149 | — | — |
| PbO | 10 | 31.9 | — | — | — | — | — | — | — | — | — |
| $NO_2$ | — | — | — | — | — | — | — | 3.0 | — | — | — |
| Br | — | — | — | — | — | — | — | 0.02 | — | — | — |

Sample specimens in the form of plates were cut from the patties and then ground and polished to 1 mm or 2 mm thickness. Those plates were then continuously hydrated and subjected to an ion exchange reaction involving Ag+ for Na+ ions by immersing the plates into an aqueous bath of a silver-containing salt within an autoclave. Table II recites the results of such treatments plus the results observed when the hydrated and ion exchanged sample specimens were exposed to ultraviolet (UV) radiation for 12 hours with a Blak-Ray ® light, six hours with a 1000 watt HgXe arc source, or three hours with a 2500 watt HgXe arc source. Hence, Table II recites the ingredients in one liter of the aqueous ion exchange (I.E.) solution along with the temperature employed for the ion exchange and the length of time the sample was immersed within the solution at the elevated temperature. The nitric acid employed was a 16 N aqueous solution. The ion exchange reactions were conducted at the saturated steam pressure of the ion exchange solution. Finally, the appearance of the glass after the ion exchange reaction and the appearance of the glass after exposure to ultraviolet radiation are also recorded in Table II.

The source of ultraviolet radiation used consisted of a ULV-56 BLAK-RAY ® lamp marketed by Ultra-Violet Products, Inc., San Gabriel, Calif., which is a 6-watt black light fluorescent lamp having total output intensity of 0.7 milliwatts/cm$^2$ and between 320 and 400 nm, with the peak of the radiation being at 356 nm. The 1000 watt HgXe lamp was a Model 6295 Oriel short arc marketed by Oriel Corporation of America, Stamford, Conn. The 2500 watt HgXe ultraviolet source as a Model 390 Ultraviolet Exposer System marketed by Optical Radiation Corporation, Azusa, Calif. The glasses were transparent unless noted otherwise.

TABLE II

| Example | I.E. Solution Ingredients | Temp. °C. | Time Hours | Appearance After I.E. | Appearance After UV |
|---|---|---|---|---|---|
| 16 | 1g AgNO$_3$ + 10 cc HNO$_3$ | 240 | 16 | Translucent yellow | No change |
| 17 | 1g AgNO$_3$ + 10 cc HNO$_3$ | " | " | Translucent tan | Light brown |
| 18 | 1g AgNO$_3$ + 10 cc HNO$_3$ | " | " | Translucent white | Very light gray |
| 19 | 1g AgNO$_3$ + 10 cc HNO$_3$ | " | " | Yellow | No change |
| 5 | 10g AgNO$_3$ | 275 | 2 | Powdery yellow surface layer | No change |
| 4 | " | " | " | Powdery yellow surface layer | " |
| 6 | " | " | " | Powdery yellow surface layer | " |
| 7 | " | " | " | Powdery yellow surface layer | " |
| 20 | 10g AgNO$_3$ + 10 cc HNO$_3$ | " | 16 | Bright yellow | No change |
| 21 | 10g AgNO$_3$ + 10 cc HNO$_3$ | 275 | 16 | Red | Dark violet |
| 22 | 10g AgNO$_3$ + 10 cc HNO$_3$ | " | " | Colorless | Light blue |
| 23 | 10g AgNO$_3$ + 10 cc HNO$_3$ | " | " | White (leached) | No change |
| 24 | 10g AgNO$_3$ + 10 cc HNO$_3$ | " | " | Orange | Brown |
| 25 | 20g AgNO$_3$ + 10 cc HNO$_3$ | 250 | 2 | Light orange | Dark brown |
| 26 | 20g AgNO$_3$ + 10 cc HNO$_3$ | " | " | Light orange | Dark brown |
| 27 | 20g AgNO$_3$ + 10 cc HNO$_3$ | " | " | Bright yellow | No change |
| 27 | 20g AgNO$_3$ + 10 cc HNO$_3$ | 275 | " | Translucent brown | Slight gray tint on brown |
| 28 | 20g AgNO$_3$ + 10 cc HNO$_3$ | " | " | Colorless with yellow cord | No change except yellow cord turns brown |
| 29 | 20g AgNO$_3$ + 10 cc HNO$_3$ | " | " | Translucent pink | Gray |
| 25 | 20g AgNO$_3$ + 10 cc HNO$_3$ | 275 | 2 | Translucent beige | Lightly gray |
| 30 | 20g AgNO$_3$ + 10 cc HNO$_3$ | " | " | Brown | Dark yellow green |
| 14 | 20g AgNO$_3$ + 10 cc HNO$_3$ | " | " | Dark brown | Black |
| 27 | 20g AgNO$_3$ + 10 cc HNO$_3$ | 300 | " | Yellow | Yellow brown |
| 29 | 20g AgNO$_3$ + 10 cc HNO$_3$ | " | " | Translucent pink | Bluish brown |
| 5 | 10g AgNO$_3$ + 10 cc HNO$_3$ | 275 | " | Yellow with gray streaks | Streaks of non-uniform color, mostly purple |
| 33 | 1g AgNO$_3$ + 10 cc HNO$_3$ | 240 | 16 | Bright orange | Slightly darkened |
| 34 | 10g AgNO$_3$ + 10 cc HNO$_3$ | 275 | 16 | Red | Very dark red |
| 35 | 10g AgNO$_3$ + 10 cc HNO$_3$ | " | " | Bright orange | Darker orange |

As can be seen from Table II, the color of the glass after ion exchange and the color after ultraviolet exposure will be dependent upon three factors: the glass composition, the ingredients of the ion exchange solution, and the temperature and duration of ion exchange. Thus, all the colors of the visible spectrum in varying saturations can be obtained by altering those parameters.

It has been found that only those glasses having chloride in their compositions manifest substantial darkening and/or color change upon the being subjected to ultraviolet radiation. It has also been learned that only some of those ultraviolet darkened products exhibit photo-dichroic effects when bleached with polarized light. The sensitivity of the photo-anisotropic effect is a function of the wavelength of the bleaching light and the color of the ion exchanged glass layer before and after ultraviolet exposure, as well as of all of the above-cited variables present in the preparation of the ion exchange products. And, as was observed above, another critical parameter is believed to be the concentration ratio $Ag^+$:$H^+$ ions in the components of the ion-exchange solution.

The fact that both silver and chloride are present in all of the products from the solution ion exchange reaction which are darkened by ultraviolet radiation, plus the fact that ultraviolet darkening is a prerequisite to photoanisotropic behavior, would seem to indicate that the photoanisotropic color centers are Ag-AgCl crystals or complex crystals containing Ag and AgCl. It is postulated that the photo-dichroic color centers result from the physical contact and/or the close proximity between silver particles to AgCl-containing crystals which makes available the conduction band of the AgCl crystal to the photo-electrons of the silver aggregates which are excited by the bleaching light.

Figure 8A:
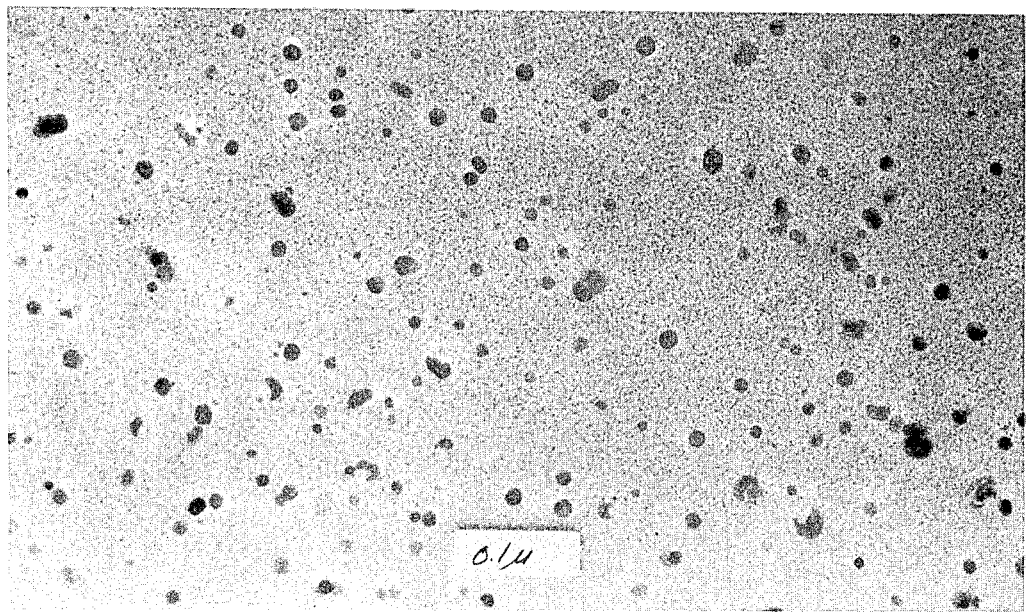
FIGS. 8A and 8B are transmission electron micrographs of an inventive product, the white bar at the base of each photograph representing a distance of one micron.
Figure 8B:
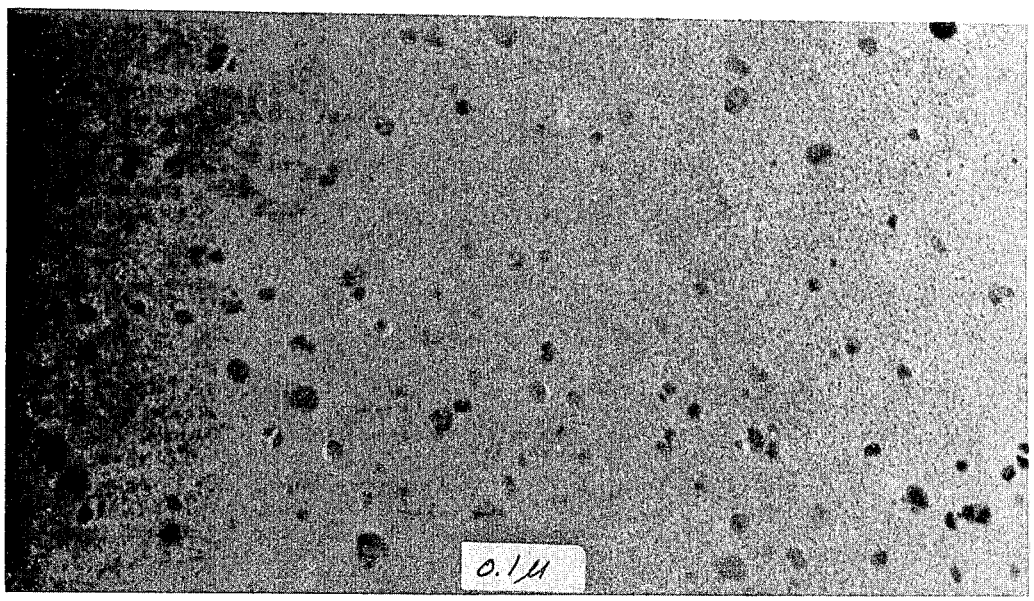

The size of the Ag-AgCl complex crystals can be estimated from the transmission electron micrographs comprising FIGS. 8A and 8B (The white bar at the base of each photograph represents a distance of 0.1 micron.) The silver-containing complex crystals seem to be more-or-less spherical in shape with diameters mostly of 200 Å and below. The distribution of crystal sizes appears to be quite narrow, principally in the range of 150–200 Å. The specimen constituting the basis of FIGS. 8A and 8B was a ground and polished 2 mm thick plate of exemplary composition 38 in Table I, supra, after immersion into an aqueous solution consisting of 200 grams $LiNO_3$ + 20 grams $AgNO_3$ + 7.5 ml of 16 N $HNO_3$/liter conducted for two hours in an autoclave operating at about 1600 psig. The plate was darkened to a value of transmittance at 632 nm of about 16% through exposure to a 2500 watt HgXe arc for 40 minutes. Thereafter, a polarized red light at a wavelength of 647 nm was used for bleaching.

It is believed that aggregates of silver atoms or particles of molecular dimensions are responsible for the colors observed. The silver aggregates are envisioned as granular silver films on or in the surface of the AgCl crystals. As the volume fraction of silver in the granular film approaches unity, each aggregate of silver particles assumes the geometry of a single oblate particle. The size, shape, and volume fraction of silver in the aggregate, along with the orientation of the silver aggregates relative to the polarization of the bleaching light and the probing light, are key factors which determine the color and the sensitivity of the photo-anisotropy. Those variables, however, are predetermined by the microstructure of the AgCl-containing crystals which are formed during the solution ion exchange reaction.

The following is a proposed explanation for the growth of AgCl-containing crystals during the solution ion exchange reaction. The mechanism therefor is considered to involve three rate processes.

First, pores or chlorine bubbles having diameters of a few hundred angstroms or less are developed. The size and population of these pores are a function of overall composition of the glass, and the process parameters of the ion exchange reaction.

Second, $Na^+$ and $Ag^+$ ions are diffused to the pores. Chlorine or chloride ions diffuse to the pores if not already present therein.

Third, AgCl-NaCl mixed crystals are formed. Inasmuch as the concentration of $Cl^-$ is very limited, the exchange of $Ag^+$ for $Na^+$ ions in the AgCl-NaCl mixed crystals will take place when the concentration of $Ag^+$ ions in the hydrated glass is sufficiently high. Consequently, one of the controlling variables which delimits the microstructure and composition of the AgCl-containing crystals is the concentration of $Ag^+$ ions in the hydrated-ion exchanged glass layer.

To illustrate the criticality of solution hydration to the operability of the instant invention, the following experiment was conducted. Example 12 of Table I (a chloride-containing glass) was hydrated in a saturated steam atmosphere at 300° C. to yield a white, opaque body. Examination of the body via a scanning electron microscope revealed the presence of crystals having a cubic habit in a spherical cavity. X-ray emission analyses demonstrated that the crystals were NaCl. It appears that the solubility of chlorine in the anhydrous glass is greater than in the hydrated glass at 300° C. Because of the viscosity of the glass and the saturated steam pressure surrounding the glass body, pores or chlorine gas bubbles were formed during hydration of the glass in a steam environment. NaCl crystals were formed through the diffusion of $Na^+$ ions to the chlorine bubbles.

Whereas it has been found that the concentration of $Ag^+$ ions in the hydrated layer can be monitored through the concentration ratio $[Ag^+]/[H^+]$ of the solution and the temperature of the ion exchange reaction, many other variables also affect the rate processes and, therefore, the growth and final structure of the AgCl-containing crystals. Accordingly, a critical combination of all the variables is demanded to secure a product demonstrating specific properties. The most preferred type of product resulting from the instant invention is colorless after the ion exchange reaction, colorless implying that all silver in the hydrated glass layer remains in the ionic state. After exposure to ultraviolet radiation up to the depth of penetration of ultraviolet radiation in the glass, the hydrate, ion-exchanged layer displays various shades of blue coloration, ranging from greenish blue to saturated blue to a purplish blue, and exhibits a strong absorption band around 700 nm with little or no absorption due to spontaneous warm-in silver at 420 nm. Consequently, the products of the instant invention consist of a unique microstructure involving AgCl-containing crystals dispersed within a glassy matrix, this microstructure being possible only within a limited range of glass composition, within a particular $[Ag^+]/[H^+]$ ratio in the ion exchange solution, and within a narrowly-defined interval of time and temperature in the ion exchange reaction. The oxidation state of the final product is largely determined by the components of the ion exchange solution and the temperature of the ion exchange reaction. Additions of redox agents, however minute, to the batch ingredients are not desirable. Thermal reducing agents in particular, such as $SnO$, $Sb_2O_3$, and $As_2O_3$, are definitely to be avoided. Hence, $As_2O_3$ and/or $Sb_2O_3$ ought not be utilized as fining agents.

The limited operable ranges of the various parameters are illustrated in Tables IIIA, B, C, D, E, and F. The specimens for each example consisted of 1 mm or 2 mm thick plates with ground and polished surfaces.

The appearance of each example after the ion exchange reaction is recited in the third column of such table. Unless specified otherwise, the glass plates after the solution ion exchange were transparent. The transmittance of the plates typically has a constant value between about 90–96% throughout the visible spectral range, but is dependent upon composition and the process parameters to which it is subjected. The yellow coloration resulting from the presence of copper ions in those glasses such as Example 5, 7, and 13, containing CuO as a batch material, does not appear to degrade the photo-dichloric effect.

The colors of the ion exchange plates after 2 and 12 hours exposure to ultraviolet radiation (0.7 milliwatt/$cm^2$) are tabulated in the fourth and sixth column, respectively. The source of ultraviolet radation is again the ULV-56 BLAK-RAY® lamp discussed above. Where a 1000 watt or 2500 watt high pressure HgXe arc has been utilized as the source of ultraviolet radiation, a 60 and 30 minute exposure, respectively, has yielded optical density values more-or-less similar to those produced through a 2-hour exposure with the BLAK-RAY® lamp. The relative intensities of colors displayed by the ultraviolet-darkened, ion exchanged products, i.e., the photo-dichroic surface layers, are also described in those columns, E, G, F, P, and N representing excellent, good, fair, poor, and non-darkening, respectively. Relating those characterizations to optical density units, the ratings generally correspond to $EE \geq 4$, $4 > E \geq 3$, $3 > G \geq 2$, $2 > F \geq 1$, $P < 1$, and $N = 0$ at the absorption peak.

The photo-dichroic behavior of these specimens was tested with a 4 milliwatt He-Ne laser, the beam passing through a spatial filter, a prism polarizer and lens assembly to form a circular spot on the specimen having the size of 1 mm in diameter. The result is a beam of linearly-polarized red light having a wavelength of 632 nm whose intensity is about 1.5 milliwatt/$mm^2$. The bleached area appears red in parallel polarization and appears a darker blue than the unbleached area in perpendicular polarization. Visual observation of this contrast in polarizing spots, obtained via looking through a rotating polarizer in front of the specimen, is reported in columns 5 and 7 for the spots in the 2 and 12 hour ultraviolet darkened areas, respectively. E, G, F, and N depict excellent, good, fair, and no dichroism, respectively, produced via a one-minute bleaching with the polarized red light. The corresponding energy density of the bleaching light beam is 9j/$cm^2$ at an intensity of 0.15 watt/$cm^2$. The results secured through a 10-minute bleaching exposure are also reported in Table IIIB. In terms of dichroic ratio, which is defined as $$R = \frac{\log T_o^o/T_\perp}{\log T_o^o/T_{11}}$$

wherein $T_\perp$ is transmittance in perpendicular polarization. $T_{11}$ is transmittance in parallel polarization, and $T_o^o$ is the original (undarkened) transmittance of the glass the ratings correspond generally to $EE > 2$, $2 \geq E > 1.5$, $1.5 \geq G > 1.25$, $1.25 \geq F > 1$, and $N = 1$, respectively. It will be appreciated that the correlations may be somewhat imprecise since they are based upon visual inspection.

To assist in securing an understanding of bleaching efficiency, each ultraviolet-darkened hydrate layer, i.e., the photo-dichroic layer, may be considered as being composed of a large number of very thin sublayers, with the last sublayer never being subjected to the full intensity of the bleaching beam. When the energy density, 9j/$cm^2$, is not adequate to bleach through an exchanged surface of a sample having a very high optical density, no contrast will be observed. In such a case, however, one cannot a priori conclude that the particular glass exhibits poor efficiency of photo-dichroism.

For example, in a glass demonstrating two units of optical density, i.e., 20 db, in the first sublayer, the remainder of the photo-dichroic layer sees at most 1% of the intensity of the bleaching beam at time $t=0$. At the end of a one-minute exposure, the first sublayer may transmit 10% in parallel polarization. Therefore, the total energy to which the second sublayer is exposed is only $4.6 \times 10^{-1}$j/$cm^2$ instead of the 9j/$cm^2$ impinging upon the top surface of the first sublayer. With very dark specimens, e.g., those rated EE in columns 4 or 6, which can be bleached through in one minute with the 1.5 milliwatt/$mm^2$ laser beam, the energy density necessary to bleach through the second sublayer is of the order of $4.6 \times 10^{-1}$j/$cm^2$, i.e., 4.6 nj/$\mu m^2$. However, the required energy density may be reduced somewhat when the ultraviolet-darkened, ion exchanged layer is preconditioned for maximum efficiency of photo-anisotropy.

Table IIIA records the two-hour solution ion exchange of several exemplary compositions from Table I above in an aqueous solution containing 20 g Ag-$NO_3$+7 cc of 16 N $HNO_3$/liter of solution operating at various temperatures. The pH of the ion exchange solution was 0.95. Also reported are the appearances of the specimens after the ion exchange, the colors of the specimens after a two-hour exposure to ultraviolet radiation and the extent of dichroism after a one-minute bleaching of the specimens in the laser beam, and the colors of the specimens after a 12-hour exposure to ultraviolet radiation and the extent of dichroism after a one-minute bleaching in the laser beam.

TABLE IIIA

| Example | Temp. °C. Ion Exchange | Appearance After Ion Exchange | Color After 2 Hour UV | 1 min. Bleach | Color After 12 Hour UV | 1 min. Bleach |
| --- | --- | --- | --- | --- | --- | --- |
| 5 | 250° | Light yellow | Blue-green, P-N | N | Green blue, P | N |
| 4 | " | Colorless | Blue, P | N | Blue, F | N |
| 6 | " | Colorless | Blue, P | N | Blue, G | N |
| 7 | " | Light yellow | Blue-green P-N | N | Blue, P | N |
| 8 | " | Colorless | Blue, P | N | Blue, P | N |
| 2 | " | Colorless | Blue, P | N | Blue, G | N |
| 5 | 260° | Light yellow | Green-blue, P | N | Green-blue, F | N |
| 4 | " | Colorless | Blue, P | N | Blue, F | N |
| 6 | " | Colorless | Blue, P | N | Blue, G | N |

TABLE IIIA-continued

| Example | Temp. °C. Ion Exchange | Appearance After Ion Exchange | Color After 2 Hour UV | 1 min. Bleach | Color After 12 Hour UV | 1 min. Bleach |
|---|---|---|---|---|---|---|
| 7 | " | Light yellow | Green-blue, P | N | Green-blue, F | N |
| 8 | " | Colorless | Blue, P | N | Blue, F | N |
| 2 | " | Colorless | Blue, P | N | Blue, G | N |
| 5 | 270° | Yellow | Green-blue, F-P | F | Blue-green, G | F |
| 4 | " | Colorless | Blue, F-P | F | Sky-blue, G | F |
| 6 | " | Colorless | Blue, F-P | F | Sky blue, G | F |
| 7 | " | Light yellow | Green-blue, F-P | F | Blue-green, G | F |
| 8 | " | Colorless | Blue, F-P | F | Blue, G | F |
| 2 | " | Colorless | Blue, F-P | F | Blue, G | F |
| 5 | 280° | Yellow | Blue-gray, F | F | Blue-green, E-G | F |
| 4 | " | Colorless | Blue, F | F | Blue, E-G | F |
| 6 | " | Colorless | Blue, F | F | Blue, E-G | F |
| 7 | " | Yellow | Blue-gray, F | F | Blue-green, E-G | F |
| 8 | " | Colorless | Blue, F | F | Blue, E-G | F |
| 2 | " | Colorless | Blue, F | F | Blue, E-G | F |
| 5 | 290° | Yellow | Blue-green, F | F | Blue-green, E | F |
| 4 | " | Colorless | Blue, F | F | Blue, E | F |
| 6 | " | Colorless | Blue, F | F | Blue, E | F |
| 7 | " | Yellow | Blue-gray, F | F | Blue-green, E | F |
| 8 | " | Colorless | Blue, F | F | Blue, E | F |
| 2 | " | Colorless | Blue, F | F | Blue, E | F |
| 5 | 300° | Yellow | Blue-green, F | G | Gray, E | F |
| 4 | " | Colorless | Blue, G | G | Blue, E | F |
| 6 | " | Colorless | Blue, G | G | Blue, E | F |
| 7 | " | Yellow | Blue-gray, F | G | Gray-blue, E | F |
| 8 | " | Colorless | Blue, G | G | Blue, E | F |
| 2 | " | Colorless | Blue, G | G | Blue, E | F |
| 5 | 310° | Yellow | Yellow-gray, F | E | Yellow-gray, E | G |
| 4 | " | Colorless | Blue, G | G | Blue, E | G |
| 6 | " | Colorless | Blue, G | G | Blue, E | G |
| 7 | " | Yellow | Yellow-gray, F | E | Gray-blue, E | G |
| 8 | " | Colorless | Blue, G | G | Blue, E | G |
| 2 | " | Colorless | Blue, G | G | Blue, E | G |
| 5 | 320° | Yellow | Gray-purple, G | EE | Gray-blue, EE | * |
| 4 | " | Colorless | Blue, G | E | Blue, EE | G |
| 6 | " | Colorless | Blue, G | E | Blue, EE | G |
| 7 | " | Yellow | Red-purple, G | EE | Red-purple, EE | F |
| 8 | " | Colorless | Blue, G | E | Blue, EE | G |
| 2 | " | Colorless | Blue, G | E | Blue, EE | G |
| 5 | 330° | Yellow | Gray-orange, P | N | Gray-orange, F-P | F |
| 4 | " | Yellow | Yellow-green, P | N | Yellow-green, P | F |
| 6 | " | Yellow | Yellow-green, P | N | Yellow-green, P | F |
| 7 | " | Yellow | Gray-orange, P | N | Gray-orange, P | F |
| 8 | " | Yellow | Yellow-green, P | N | Yellow-green, P | F |
| 2 | " | Yellow | Yellow-green, P | N | Yellow-green, P | F |
| 5 | 340° | Orange | Gray-orange, P-N | N | Gray-orange, P | F |
| 4 | " | Light yellow | Yellow-green, P-N | N | Yellow-green, P | F |
| 6 | " | Light yellow | Yellow-green, P-N | N | Yellow-green, P | F |
| 7 | " | Orange | Gray-orange, P-N | N | Gray-orange, P | F |
| 8 | " | Light yellow | Yellow-green, P-N | N | Yellow-green, P | F |
| 2 | " | Light yellow | Yellow-green, P-N | N | Yellow-green, P | F |

*Too dark to bleach completely through in one minute.

Table IIIB recites the two-hour solution ion exchange of several exemplary compositions from Table I above in an aqueous solution containing 200 g LiNO₃+20 g AgNO₃+10 cc of 16 N HNO₃/liter of solution operating at various temperatures. The pH of the ion exchange solution was 0.8. Also reported are the appearances of the specimens after the ion exchange, the colors of the specimens after a two-hour exposure to ultraviolet radiation and the extent of dichroism after one-minute and 10-minute bleachings of the specimens in the laser beam, and the colors of the specimens after a 12-hour exposure to utraviolet radiation and the extent of dichroism after one-minute and 10-minute bleachings in the laser beam.

TABLE IIIB

| Example | Temp. °C. Ion Exchange | Appearance After Ion Exchange | Color After 2 Hour UV | 1 min. Bleach | 10 min. Bleach | Color After 12 Hour UV | 1 min. Bleach | 10 min. Bleach |
|---|---|---|---|---|---|---|---|---|
| 5 | 250° | Light yellow | Green-blue, P | N | F | Green-blue, F | F-N | F |
| 11 | " | Colorless | Blue, P | N | F | Blue, F | F-N | F |
| 2 | " | Colorless | Blue, P | N | F | Blue, F | F-N | |
| 7 | " | Yellow | Green-blue, P | N | N | Green-blue, F | F-N | |
| 9 | " | Colorless | Blue, G | G | | Blue, E | F-N* | |
| 10 | " | Colorless | Blue, G | E | | Blue, E | F-N* | |
| 5 | 270° | Yellow | Blue-green, F | N | G | Blue-green, G-F | N | G |
| 11 | " | Colorless | Blue, F | N | G | Blue, G-F | N | G |
| 2 | " | Colorless | Blue, F | N | G | Blue, G-F | N | G |
| 7 | " | Yellow | Blue-green, F | N | G | Blue-green, G-F | N | G |
| 9 | " | Colorless | Purple, G | G | | Blue, E | N | |
| 10 | " | Colorless | Purple, G | G | | Blue, E | N | |
| 5 | 300° | Yellow | Blue-green, F | N | G | Blue-green, G-F | N | G |

TABLE IIIB-continued

| Example | Temp. °C. Ion Exchange | Appearance After Ion Exchange | Color After 2 Hour UV | 1 min. Bleach | 10 min. Bleach | Color After 12 Hour UV | 1 min. Bleach | 10 min. Bleach |
|---|---|---|---|---|---|---|---|---|
| 11 | " | Colorless | Blue, F | N | G | Blue, G-F | N | G |
| 2 | " | Colorless | Blue, F | N | G | Blue, G-F | N | G |
| 7 | " | Yellow | Blue-green, F | N | G | Blue-green, G-F | N | G |
| 15 | " | Colorless | Purple-blue, G | G | E | Blue, E | N | E |
| 10 | " | Colorless | Blue, G | G | | Blue, E | N | |
| 5 | 320° | Yellow | Yellow-gray, F | E | E | Gray, G | E | E |
| 11 | " | Colorless | Blue, F | G | E | Purple, G | F | E |
| 2 | " | Colorless | Blue, F | G | E | Blue, G | G | E |
| 7 | " | Yellow | Yellow-purple, F | E | E | Red-purple, G | E | E |
| 15 | " | Colorless | Blue, F | E | | Blue, G | E | E |
| 10 | " | Colorless | Green-blue, F | E | | Blue, G | E | |
| 5 | 340° | Yellow | Mustard, F | F | F | Gray-mustard, G | F | F |
| 11 | " | Yellow | Green, F | F | F | Green, G | F | F |
| 2 | " | Yellow | Blue, F | F | F | Blue, G | F | F |
| 7 | " | Yellow | Gray-yellow, F | F | G | Gray-yellow, G | F | |
| 15 | " | Yellow | Blue, F | G | E | Blue, G | E | E |
| 10 | " | Yellow | Green, P | F | E | Blue-green, G | E | E |

*Too dark to bleach completely through in one minute.

Table IIIC records the six-hour solution ion exchange of several exemplary compositions from Table I above in an aqueous solution containing 200 g $LiNO_3$+20 g $AgNO_3$+10 cc of 16 N $HNO_3$+1 g silica gel/liter of solution operating at various temperatures. The pH of the ion exchange solution was 0.8. Also listed are the appearances of the specimens after the ion exchange, the colors of the specimens after a two-hour exposure to ultraviolet radiation and the extent of dichroism after a one-minute bleaching of the specimens in the laser beam, and the colors of the specimens after a 12-hour exposure to ultraviolet radiation and the extent of dichroism after a one-minute bleaching in the laser beam.

Table IIID recites the two-hour solution ion exchange of several exemplary compositions from Table I above in aqueous solutions containing 40 g $AgNO_3$ + varying amounts of 16 N $HNO_3$/liter of solution operating at 300° C. The pH of the solution obviously varied with the content of $HNO_3$. Also reported are the appearances of the specimens after the ion exchange, the colors of the specimens after a two-hour exposure to ultraviolet radiation and the extent of dichroism after a one-minute bleaching of the specimens in the laser beam, and the colors of the specimens after a 12-hour exposure to ultraviolet radiation and the extent of dichroism after a one-minute bleaching in the laser beam.

TABLE IIIC

| Example | Temp. °C. Ion Exchange | Appearance After Ion Exchange | Color After 2 Hour UV | 1 min. Bleach | Color After 12 Hour UV | 1 min. Bleach |
|---|---|---|---|---|---|---|
| 5 | 250° | Yellow | Blue, P | N | Blue, F | N |
| 11 | " | Colorless | Blue, P | N | Blue, F | N |
| 12 | " | Colorless | Blue, P | F | Blue, F | F |
| 13 | " | Yellow | Blue-green, P | N | Blue-green, F | N |
| 9 | " | Milky-white, translucent | Purple, G | G | Purple, F | G |
| 10 | " | Slight yellow | Purple, G | G | Purple, F | G |
| 5 | 270° | Yellow | Blue-green, P | G | Blue-green, G | G |
| 11 | " | Colorless | Purple-blue, P | G | Purple-blue, G | G |
| 12 | " | Colorless | Purple-blue, P | G | Purple-blue, G | G |
| 13 | " | Yellow | Blue-green, P | G | Blue-green, G | G |
| 9 | " | Milky-white, | Purple, E | N* | Purple, E | |
| 10 | " | Colorless translucent | Purple, E | N* | Purple, E | |
| 5 | 300° | Yellow | Yellow-blue, G-F | G | Green-blue | G |
| 11 | " | Colorless | Purple, G-F | G | Purple-blue, G | G |
| 12 | " | Colorless | Purple-blue, G-F | G | Purple-blue, G | G |
| 13 | — | Yellow | Yellow-blue, G-F | G | Yellow-blue, G | G |
| 9 | " | Colorless | Purple, G | E | Blue, E | N* |
| 10 | " | Colorless | Purple, E | E | Blue, E | N* |
| 5 | 320° | Yellow | Green, G | E | Green-blue, G | E |
| 11 | " | Colorless | Purple-blue, G | E | Blue, G | E |
| 12 | " | Colorless | Purple-blue, G | E | Purple, G | E |
| 13 | " | Yellow | Green, G | E | Green-blue, G | E |
| 9 | " | Colorless | Purple, G | E | Purple-blue, G | E |
| 10 | " | Colorless | Purple, E | | Purple-blue, E | E |
| 5 | 340° | Yellow | Yellow, F | G | Green-blue, G | E |
| 11 | " | Yellow | Green, F | G | Green, G | E |
| 12 | " | Yellow | Blue, F | E | Blue, G | E |
| 13 | " | Yellow | Green, F | E | Green-blue, G | E |
| 9 | " | Yellow | Blue, F | E | Blue, G | E |
| 10 | " | Yellow | Yellow, P | P | Yellow with blue cord, G | E |

*Too dark to bleach completely through in one minute.

TABLE IIID

| Example | HNO₃ Additions + pH | Appearance After Ion Exchange | Color After 2 Hour UV | 1 min. Bleach | Color After 12 Hour UV | 1 min. Bleach |
|---|---|---|---|---|---|---|
| 5 | 30 cc, pH 0.32 | Yellow | Yellow-gray, G | E | Gray, E | G |
| 4 | " | Colorless | Purple-blue, G | E | Blue, E | F |
| 6 | " | Colorless | Purple-blue, G | E | Blue, E | F |
| 7 | " | Yellow | Green-blue, G | E | Blue-green, E | F |
| 8 | " | Colorless | Purple-blue, G | E | Blue, E | F |
| 2 | " | Colorless | Blue, G | E | Blue, E | F |
| 5 | 25 cc, pH 0.40 | Yellow | Gray-blue, F | F | Purple, G | F |
| 4 | " | Colorless | Purple-blue, F | F | Blue, G | F |
| 6 | " | Colorless | Purple-blue, F | F | Blue, G | F |
| 7 | " | Yellow | Gray-yellow, F | F | Green-blue, G | F |
| 8 | " | Colorless | Purple-blue, F | F | Blue, G | F |
| 2 | " | Colorless | Purple-blue, F | F | Blue, G | F |
| 5 | 20 cc, pH 0.49 | Yellow | Gray, F | E | Purple, G | F |
| 4 | " | Colorless | Purple, F | E | Blue, G | F |
| 6 | " | Colorless | Purple, F | G | Blue, G | F |
| 7 | " | Yellow | Gray, F | E | Purple, G | F |
| 8 | " | Colorless | Purple, F | E | Blue, G | F |
| 2 | " | Colorless | Blue, F | G | Blue, G | F |
| 5 | 15 cc, pH 0.62 | Yellow | Yellow-gray, F | E | Green, E | F |
| 4 | " | Colorless | Purple, F | E | Blue, E | F |
| 6 | " | Colorless | Purple, F | E | Blue, E | F |
| 7 | " | Yellow | Gray, F | E | Green-blue, E | F |
| 8 | " | Colorless | Purple, F | E | Blue, E | F |
| 2 | " | Colorless | Purple, F | G | Blue, E | F |
| 5 | 10 cc, pH 0.80 | Yellow | Yellow-gray, G | E | Gray-blue, E | F |
| 4 | " | Colorless | Purple, G | E | Blue, E | F |
| 6 | " | Colorless | Purple, F | G | Blue, E | F |
| 7 | " | Yellow | Yellow-gray, G | E | Blue-green, E | F |
| 8 | " | Colorless | Purple, G | E | Blue, E | F |
| 2 | " | Colorless | Purple, G | E | Blue, E | F |
| 5 | 8 cc, pH 0.9 | Yellow | Yellow-gray, F | G | Gray-blue, E | F |
| 4 | " | Colorless | Purple, F | G | Blue, E | F |
| 6 | " | Colorless | Blue, P | G | Blue-green, F | E |
| 7 | " | Yellow | Green, F | E | Blue, E | E |
| 8 | " | Colorless | Blue, F | G | Blue, E | G |
| 2 | " | Colorless | Blue, P | G | Blue, G | G |
| 5 | 5 cc, pH 1.1 | Yellow | Gray-yellow, P | N | Gray-yellow, P | N |
| 4 | " | Yellow | Blue-green, P | N | Blue-green, P | N |
| 6 | " | Yellow | Blue-green, P | N | Blue-green, P | N |
| 7 | " | Yellow | Gray-yellow, P | N | Gray-yellow, P | N |
| 8 | " | Yellow | Blue-green, P | N | Blue-green, P | N |
| 2 | " | Yellow | Blue-green, P | N | Blue-green, P | N |

Table IIIE records the two-hour solution ion exchange of several exemplary compositions from Table I above in aqueous solutions containing 20 g AgNO₃ + varying amounts of 16 N HNO₃/liter of solution operating at 300° C. The pH of the solution was obviously a function of the HNO₃ content. Also tabulated are the appearances of the specimens after the ion exchange, the colors of the specimens after a two-hour exposure to ultraviolet radiation and the extent of dichroism after a one-minute bleaching of the specimens in the laser beam, and the colors of the specimens after a 12-hour exposure to ultraviolet radiation and the extent of dichroism after a one-minute bleaching in the laser beam.

TABLE IIIE

| Example | HNO₃ Additions + pH | Appearance After Ion Exchange | Color After 2 Hour UV | 1 min. Bleach | Color After 12 Hour UV | 1 min. Bleach |
|---|---|---|---|---|---|---|
| 5 | 13 cc, pH 0.68 | Yellow | Yellow-green, F | E | Blue-green, G | F |
| 4 | " | Colorless | Blue, F | G | Blue, G | F |
| 6 | " | Colorless | Blue, F | G | Blue, G | F |
| 7 | " | Slight yellow | Yellow-green, F | G | Blue-green, G | F |
| 8 | " | Colorless | Blue, F | G | Blue, G | F |
| 2 | " | Colorless | Blue, F | G | Glue, G | F |
| 5 | 11 cc, pH 0.75 | Yellow | Mustard, F | E | Blue-green, G | F |
| 4 | " | Colorless | Blue, F | G | Blue, G | F |
| 6 | " | Colorless | Blue, F | G | Blue, G | F |
| 7 | " | Yellow | Gray-blue, F | G | Blue-green, G | F |
| 8 | " | Colorless | Blue, F | G | Blue, G | F |
| 2 | " | Colorless | Blue, F | G | Blue, G | F |
| 5 | 9 cc, pH 0.84 | Yellow | Mustard, F | E | Blue-green, G | F |
| 4 | " | Colorless | Blue, F | G | Blue, G | F |
| 6 | " | Colorless | Blue, F | G | Blue, G | F |
| 7 | " | Yellow | Yellow-green, F | G | Blue-green, G | F |
| 8 | " | Colorless | Blue, F | G | Blue, G | F |
| 2 | " | Colorless | Blue, F | G | Blue, G | F |
| 5 | 6 cc, pH 1.0 | Yellow | Gray-blue, G | G | Green-blue, EE | G |
| 4 | " | Colorless | Blue, F | G | Blue, E | G |
| 6 | " | Colorless | Blue, F | G | BLue, E | G |
| 7 | " | Yellow | Green-blue, F | G | Green-blue, E | G |
| 8 | " | Colorless | Blue, F | G | Blue, E | G |

TABLE IIIE-continued

| Example | HNO₃ Additions + pH | Appearance After Ion Exchange | Color After 2 Hour UV | 1 min. Bleach | Color After 12 Hour UV | 1 min. Bleach |
|---|---|---|---|---|---|---|
| 2 | " | Colorless | Blue, F | G | Blue, E | G |
| 5 | 4 cc, pH 1.2 | Yellow | Gray-blue, F | G | Green-blue, E | G |
| 4 | " | Colorless | Blue, F | G | Blue, G | G |
| 6 | " | Colorless | Blue, F | G | Blue, G | G |
| 7 | " | Yellow | Gray-blue, F | G | Green-blue, G | G |
| 8 | " | Colorless | Blue, F | G | Blue, E | G |
| 2 | " | Colorless | Blue, G | G | Blue, E | G |
| 5 | 3 cc, pH 1.32 | Yellow | Gray-yellow, P-N | F | Yellow-gray, F-P | E |
| 4 | " | Yellow | Green, P-N | F | Blue-green, F-P | E |
| 6 | " | Yellow | Green, P-N | F | Green, F-P | E |
| 7 | " | Yellow | Gray-yellow, P-N | F | Gray-blue, F-P | E |
| 8 | " | Yellow | Green, P-N | F | Green-blue, F-P | E |
| 2 | " | Yellow | Green, P-N | F | Green, F-P | E |
| 5 | 2 cc, pH 1.5 | Yellow | Gray-yellow, P-N | N | Gray-yellow, P | F |
| 4 | " | Yellow | Green, P-N | N | Green, P | F |
| 6 | " | Yellow | Green, P-N | N | Green, P | F |
| 7 | " | Yellow | Gray-yellow, P-N | N | Gray-yellow, P | F |
| 8 | " | Yellow | Green, P-N | N | Green, P | F |
| 2 | " | Yellow | Green, P-N | N | Green, P | F |

Figure 5A:
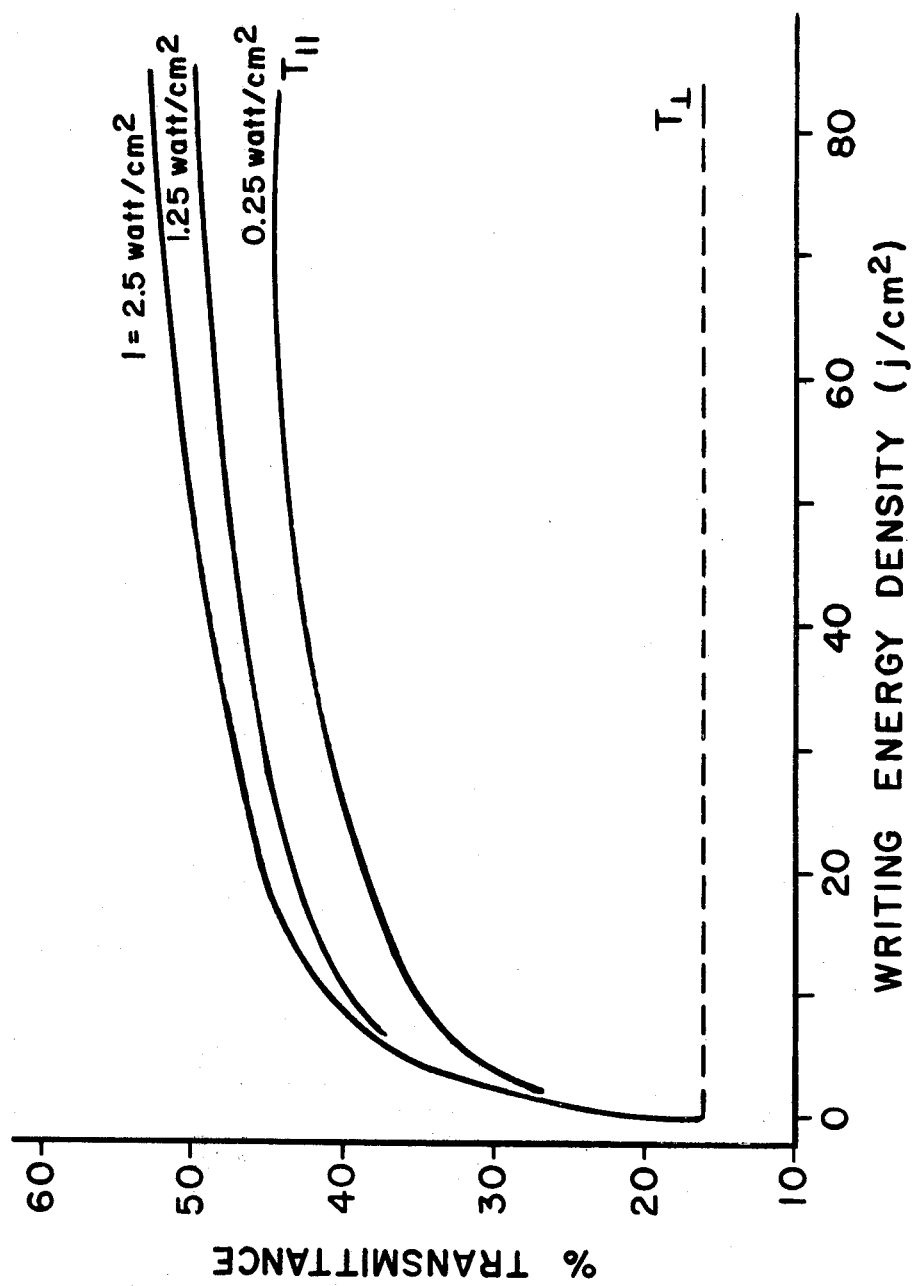
FIGS. 5A, 5B, and 5C graphically describe the photodichroic effect exhibited in the inventive products.
Figure 5B:
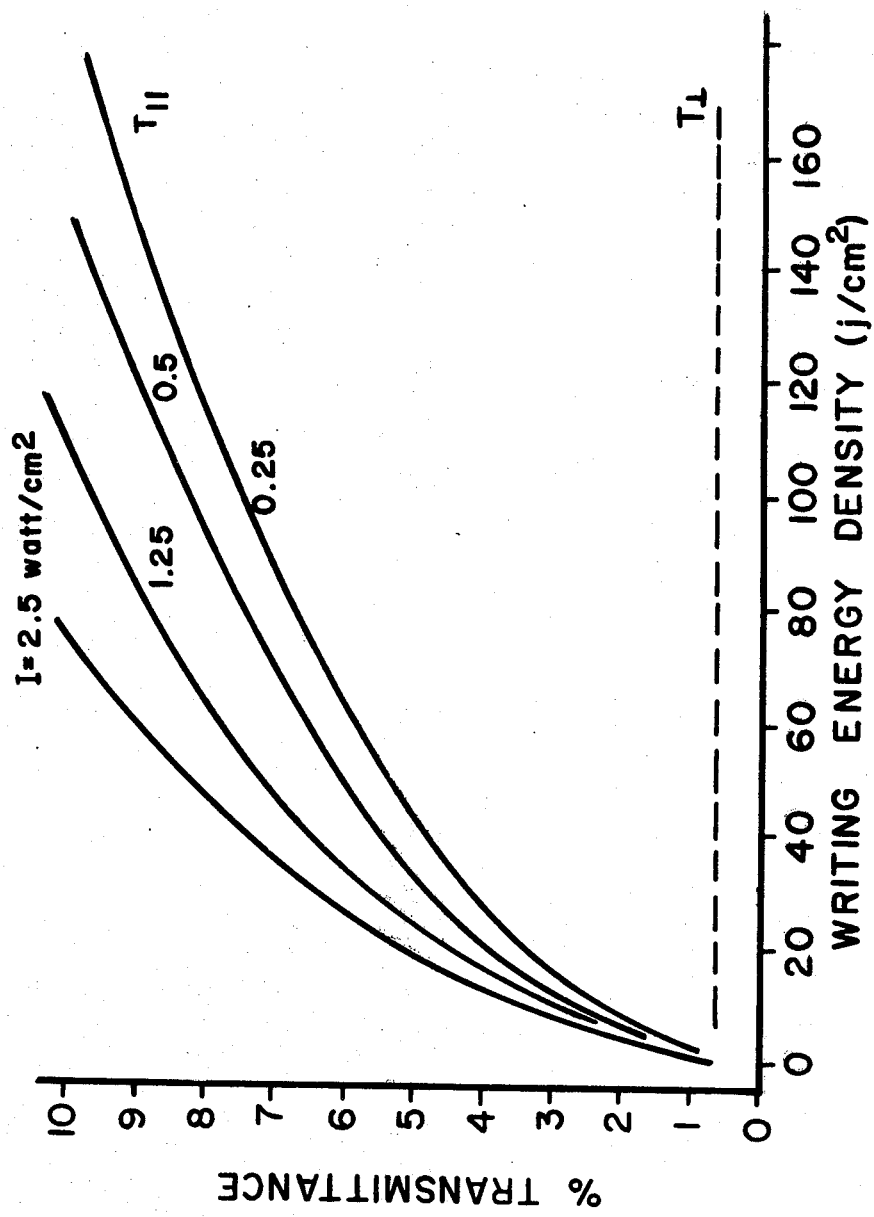

Table IIIF includes the two-hour solution ion exchange of several exemplary compositions from Table I above in aqueous solutions containing 2 g AgNO₃ + varying amounts of 16 N HNO₃/liter of solution operating at 300° C. The pH of the solution is obviously dependent upon the HNO₃ content. Also recorded are the appearances of the specimens after the ion exchange, the colors of the specimens after a two-hour exposure to ultraviolet radiation and the extent of dichroism after a one-minute bleaching of the specimens in the laser beam, and the colors of the specimens after a 12-hour exposure to ultraviolet radiation and the extent of dichroism after a one-minute bleaching in the laser beam.

combination of FIGS. 5A and 5B makes apparent the effect of these three variables on the writing energy density required to create a dichroic absorption difference of interest. As is evident from FIG. 5C, the equilibrium dichroic value in the presence of a bleaching beam is a function of the intensity of the bleaching beam. Other variables which can affect the equilibrium dichroic value include the composition of the base glass, the ingredients of the ion exchange solution, the process parameters to which the glass is subjected, and, of course, the extent to which the glass is darkened via exposure to ultraviolet radiation. The effect of these variables is demonstrated in Table IV which records

TABLE IIIF

| Example | HNO₃ Additions + pH | Appearance After Ion Exchange | Color After 2 Hour UV | 1 min. Bleach | Color After 12 Hour UV | 1 min. Bleach |
|---|---|---|---|---|---|---|
| 5 | 2 cc, pH 1.49 | Yellow | Mustard, F | EE | Green-blue, E | F |
| 4 | " | Colorless | Purple-blue, F | F | Blue, E | F |
| 6 | " | Colorless | Purple-blue, F | F | Blue, E | F |
| 7 | " | Yellow | Mustard, F | E | Green-blue, E | F |
| 8 | " | Colorless | Purple-blue, F | F | Purple-blue, E | F |
| 2 | " | Colorless | Purple-blue, F | F | Purple-blue, E | F |
| 5 | 1.5 cc, pH 1.6 | Yellow | Green, F | F | Green-blue, E | F |
| 4 | " | Colorless | Purple-blue, F | F | Blue, E-G | F |
| 6 | " | Yellow | Purple-blue, F | F | Blue, E-G | F |
| 7 | " | Colorless | Green, F | F | Green, E-G | F |
| 8 | " | Yellow | Purple-blue, F | F | Blue, E-G | F |
| 2 | " | Colorless | Blue, F | F | Blue, E-G | F |
| 5 | 1.0 cc, pH 1.8 | Yellow | Green, F | EE | Green-blue, E | G |
| 4 | " | Colorless | Green-blue, F | EE | Blue, E | EE |
| 6 | " | Colorless | Green-blue, F | EE | Blue, G | EE |
| 7 | " | Yellow | Green, F | E | Green-blue, E | EE |
| 8 | " | Colorless | Green-blue, F | E | Blue, E | E |
| 2 | " | Colorless | Green-blue, F | E | Blue, G | E |
| 5 | 0.7 cc, pH 1.95 | Yellow | Blue-green, G | F | Blue, EE | G |
| 4 | " | Yellow | Blue, E | F | Blue, E | G |
| 6 | " | Yellow | Blue-green, G | F | Blue, E-G | G |
| 7 | " | Yellow | Purple-blue, G | F | Purple, EE | E |
| 8 | " | Yellow | Blue, G | F | Blue, E-G | G |
| 2 | " | Yellow | Green-blue, F | F | Blue, G | G |
| 5 | 0.5 cc, pH 2.1 | Yellow | Yellow-green, P-N | F-N | Mustard, P | P |
| 4 | " | Yellow | Green-blue, P-N | F-N | Green-blue, P | F |
| 6 | " | Yellow | Green-blue, P-N | F-N | Green-blue, P | F |
| 7 | " | Yellow | Yellow-green, P-N | F-N | Yellow-green, P | F |
| 8 | " | Yellow | Green-blue, P-N | F-N | Green-blue, P | F |
| 2 | " | Yellow | Green-blue, P-N | F-N | Green-blue, P | F |

Figure 5C:
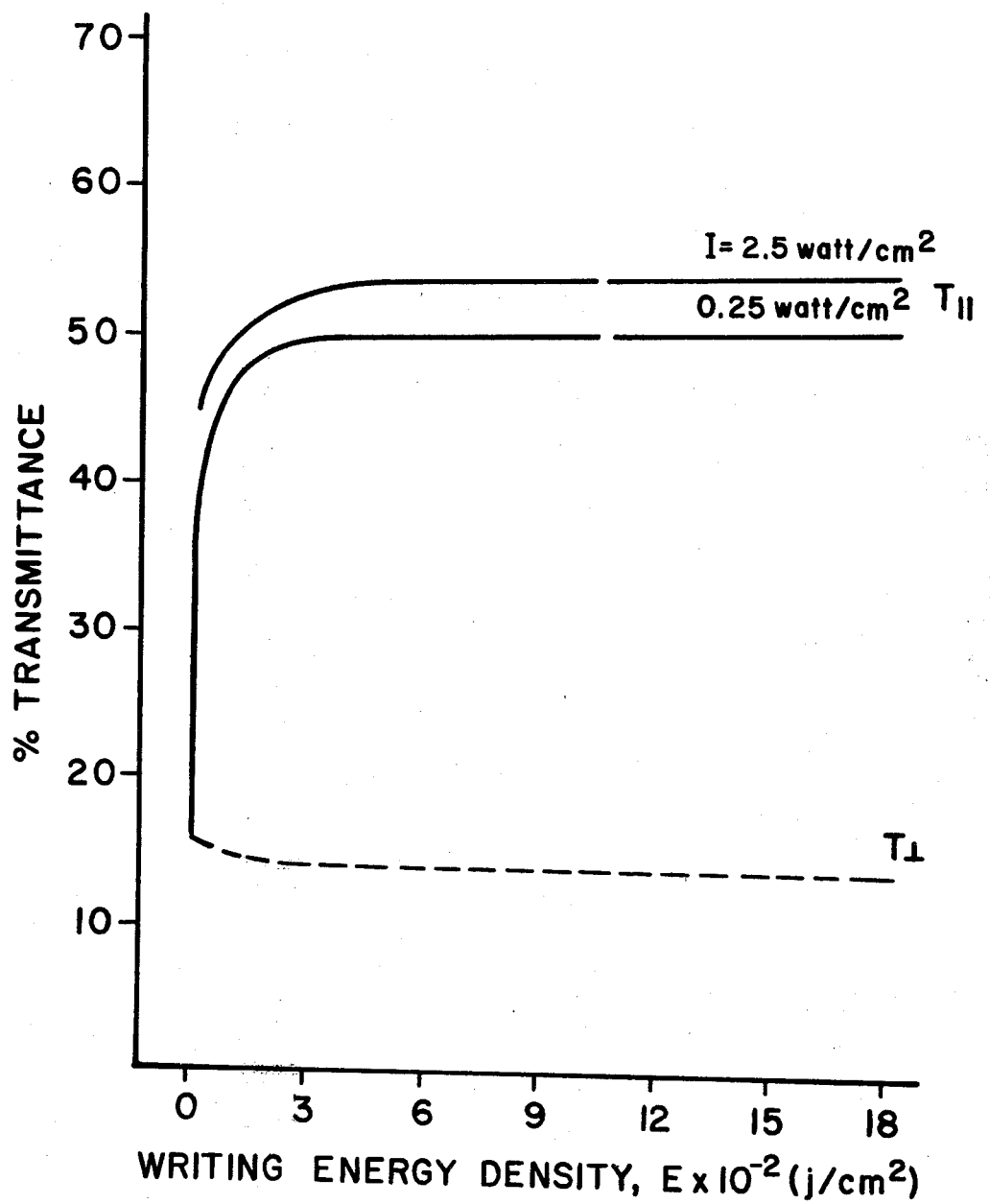

FIGS. 5A, 5B, and 5C provide a description of the efficiency of the photo-dichroic effect. The bleaching efficiency, i.e., the efficiency of the photo-dichroic effect, is encompassed within the slope of the rate curves depicted in FIGS. 5A, 5B, and 5C, and is a function of the intensity of the bleaching beam as well as the extent of ultraviolet darkening and the state of bleaching. A dichroic ratios at 632 nm along with the corresponding parallel polarization transmittance ($T_{||}$) and perpendicular polarization transmittance ($T_\perp$) obtained with several of the exemplary compositions of Table I at various levels of ultraviolet darkening. The intensity of the bleaching beam (647 nm) employed in obtaining the values of $T_{||}$ and $T_\perp$, those values approaching the asymptotic or equilibrium values, is 0.1 watt/cm². Table V lists the ingredients comprising the ion exchange solutions utilized in the experiments of Table IV.

TABLE IV

| Ex. | Ion Exchange* Solution | Temp. °C. Ion Exchange | Duration (Hrs) Ion Exchange | $T_{||}$ | $T_\perp$ | Dichroic Ratio |
|---|---|---|---|---|---|---|
| 8 | A | 300 | 2 | 86.0 | 83.5 | 1.44 |
| 8 | B | 300 | 2 | 75.4 | 65.0 | 1.75 |
| 8 | C | 300 | 2 | 58.0 | 33.8 | 2.17 |
| 8 | D | 300 | 2 | 30.5 | 1.70 | 3.62 |
| 8 | E | 300 | 2 | 15.0 | 0.02 | 4.65 |
| 8 | F | 300 | 2 | 39.1 | 4.60 | 3.50 |
| 8 | G | 300 | 2 | 34.9 | 7.30 | 2.61 |
| 8 | H | 300 | 2 | 43.5 | 6.30 | 3.58 |
| 8 | I | 300 | 2 | 52.1 | 15.2 | 3.17 |
| 8 | J | 300 | 2 | 54.5 | 16.7 | 3.26 |
| 8 | K | 300 | 2 | 47.9 | 11.4 | 3.20 |
| 8 | F | 340 | 2 | 87.5 | 80.4 | 2.69 |
| 8 | F | 330 | 2 | 80.5 | 64.5 | 2.66 |
| 8 | F | 320 | 2 | 34.5 | 0.6 | 5.13 |
| 8 | F | 300 | 2 | 28.3 | 1.0 | 3.84 |
| 8 | F | 270 | 2 | 36.0 | 15.2 | 1.92 |
| 8 | F | 260 | 2 | 44.0 | 23.0 | 1.88 |
| 8 | F | 250 | 2 | 63.6 | 48.8 | 1.72 |
| 12 | L | 320 | 6 | 40.5 | 5.60 | 3.41 |
| 12 | L | 320 | 6 | 30.1 | 1.0 | 4.05 |
| 12 | L | 300 | 6 | 55.6 | 18.3 | 3.21 |
| 12 | L | 300 | 6 | 23.6 | 0.2 | 4.51 |
| 2 | L | 300 | 2 | 25.0 | 0.9 | 3.55 |
| 2 | L | 320 | 2 | 42.4 | 3.2 | 4.34 |
| 31 | M | 320 | 6 | 49.0 | 2.0 | 6.08 |
| 31 | M | 320 | 6 | 64.0 | 14.0 | 5.19 |
| 36 | M | 320 | 6 | 51.0 | 1.0 | 7.66 |

*Ingredients of aqueous ion exchange solutions reported in Table V infra.

By definition, the true equilibrium dichroic ratio in the presence of a write beam is obtainable only with a very long period of bleaching. Accordingly, the values reported in Table IV represent the dichroic ratio at a writing energy density on the order of 1000 j/cm². In general, the dichroic ratio increases with further bleaching. For example, measurements of dichroic ratios exceeding 10 can be secured with very long periods of bleaching with linearly polarized red light. Equivalent high dichroic ratios may also be obtained with lower writing energy if the intensity of the write beam is increased.

TABLE V

| Ion Exchange Solution | Ingredients |
|---|---|
| A | 20g AgNO₃ + 1 cc 16N HNO₃/liter |
| B | 20g AgNO₃ + 2 cc 16N HNO₃/liter |
| C | 20g AgNO₃ + 3 cc 16N HNO₃/liter |
| D | 20g AgNO₃ + 5 cc 16N HNO₃/liter |
| E | 20g AgNO₃ + 6 cc 16N HNO₃/liter |
| F | 20g AgNO₃ + 7 cc 16N HNO₃/liter |
| G | 20g AgNO₃ + 9 cc 16N HNO₃/liter |
| H | 20g AgNO₃ + 10 cc 16N HNO₃/liter |
| I | 20g AgNO₃ + 11 cc 16N HNO₃/liter |
| J | 20g AgNO₃ + 12 cc 16N HNO₃/liter |
| K | 20g AgNO₃ + 13 cc 16N HNO₃/liter |
| L | 20g AgNO₃ + 200g LiNO₃ + 1g silica gel + 10 cc 16N HNO₃/liter |
| M | 20g AgNO₃ + 200g LiNO₃ + 1 liter 0.096N HNO₃ saturated with silica gel |

The multiple samples of Examples 12 and 31, depicted in Table IV, i.e., each specimen having the same glass composition and ion exchange, are instructive in illustrating the range of dichroic ratios that can be secured by ultraviolet darkening the specimens to a different degree, as is indicated via $T_\perp$. As can be seen from FIGS. 4, 5A, 5B, and 5C, in the majority of the cases $T_\perp \approx T_o$ at 632 nm, when the wavelength of the bleaching beam is 647 nm.

The photo-dichroic effect expressed as a function of the writing energy density (I·t) of the polarized red light at 647 nm is graphically illustrated in FIGS. 5A, 5B, and 5C. The rate curves set out therein utilize the intensity of the write beam as a variable parameter.

The specimens comprising the basis of FIGS. 5A and 5C were ground and polished 2 mm thick plates of exemplary composition 37 of Table I, supra, after immersion into an aqueous solution consisting of 200 grams LiNO₃+20 grams AgNO₃+7.5 ml of 16 N HNO₃/liter undertaken for six hours in an autoclave operating at about 1600 psig. The plates were darkened to a value of transmittance at 632 nm of about 16% through exposure to a 2500 watt HgXe arc for 40 minutes. Thereafter, bleaching was conducted with a polarized red light at 647 nm. The sample constituting the basis for FIG. 5B was a ground and polished 2 mm thick plate of exemplary composition 38 of Table I, supra, which had been solution ion exchanged in like manner to the specimens underlying FIGS. 5A and 5C. The plate was darkened to a transmittance of about 0.5% at 632 nm via exposure to a 2500 watt HgXe arc for 3.5 hours.

The write beam employed consisted of an 80 milliwatt linearly-polarized red light having a wavelength of about 647 nm generated from an ArKr mixed gas laser. The beam formed a 2 mm spot on the specimen. A variation in the intensity of the write beam from 2.5 watts/cm² to 0.25 watt/cm² was achieved through attenuating the laser beam power. A probing beam of spherically-polarized red light having a wave length of about 632 nm was used which formed a 0.5 mm spot on the specimen. In recording each of the rate curves, the intensity of the probing beam was adjusted to about 1% of the intensity of the write beam at the bleaching spot of the sample.

FIGS. 5A and 5B demonstrate that the efficiency of the initial photo-dichroism, as delineated in the slope of the rate curves, improves with increasing intensities of the write beam. FIG. 5C manifests that, where the writing energy density is equal, a higher value of dichroism can be obtained with a wire beam of higher intensity, and this phenomenon will continue up to and beyond 200 times the energy density which is required to effect a contrast of 1000:1.

Figure 6:
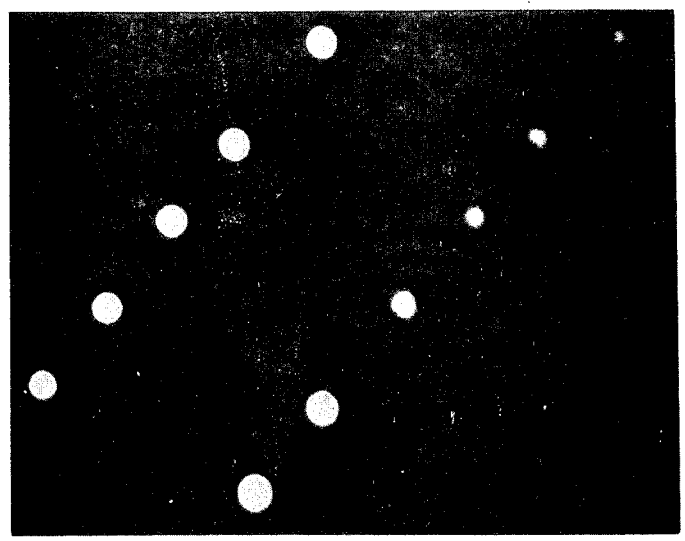
FIG. 6 is a photomicrograph of a glass plate sample of an inventive product.

The fact that dichroic absorption differences resulting from a given writing energy density increase with greater write beam intensities implies that the necessary writing energy density decreases with a shorter pulse of a more intense linearly-polarized red light. This can be demonstrated by means of photographs of recorded images. FIG. 6 compares the contrasts of dichroic images recorded at two levels of intensity where the cross sectional area of the bleaching light beam is held constant.

The upper row, consisting of five dichroic spots of nearly equal contrasts, was generated with 3.5 millisecond pulses of linearly-polarized red light having a wave length of 647 nm and an intensity of 72 watts/cm². The second row, consisting of six dichroic spots, was produced through longer pulses of the same wave length beam but at an intensity of about 10% of that used in the upper row. Going from the dimmer to the brighter spots in the second row (from right to left), the exposure periods varied as 35, 35, 35, 50, 100, and 150 milliseconds, respectively. The corresponding writing energy densities were 0.25, 0.25, 0.25, 0.36, 0.72, and 1.08 j/cm². respectively. In comparison, the writing energy density for each spot in the upper row was 0.25 j/cm².

It can be observed that among the dichroic spots which were formed utilizing an equal writing energy density, viz., 0.25 j/cm²; those resulting from shorter pulses of a higher intensity appear larger and brighter (better contrast). Accordingly, although the image of the spot developed with a writing energy density of 0.72 j/cm², but with a beam intensity of only 10% of that employed in the experiments of the upper row, appears somewhat larger, the contrast thereof is actually no better than the images of the upper row.

The sample constituting the basis of FIG. 6 was a ground and polished 2 mm thick plate of exemplary composition 36 of Table I, supra, which had been solution ion exchanged in accord with the description above of FIGS. 5A, 5B, and 5C. The write beam was again the ArKr mixed gas laser referred to in the discussion of FIGS. 5A, 5B, and 5C.

The photograph constituting FIG. 6 was taken through a conventional white light microscope utilizing crossed polarizers. The images were read between crossed polarizers having orientation of +45° and −45° with respect to the recording polarization of the spots. The reading mode may be at either the same wave length as the writing wave length, if reduced intensity and/or energy is utilized such that further bleaching is significantly diminished, or it may be in a wave length region, e.g., 850–1000 nm, where the bleaching sensitivity is nearly zero. In the latter case a reading beam of high power can be used, i.e., a beam having an intensity comparable to that of the writing beam.

The fraction of the energy of the read beam transmitted through the sequence of a polarizer (polarization direction at 0°), recorded dichroic images at 45°, and an analyzer (polarization direction at 90°) is represented by the equation $$\frac{I_{read}}{I^\circ_{read}} = \tfrac{1}{4}\left(\sqrt{T_{11}} - \sqrt{T_\perp}\right)^2 + \sqrt{T_{11}T_\perp}\,\sin^2\tfrac{\delta}{2} \quad \text{(Equation 1)}$$

where $\delta$ is the phase shift and is equal to $$\frac{2\pi d(n_{11} - n_\perp)}{\lambda}$$

and d is the thickness of the photo-dichroic layer.

When $\lambda_{read} = 632$ nm, the absorptive component is dominant and Equation 1 may be approximated by $$\frac{I_{read}}{I^\circ_{read}} = \tfrac{1}{4}\left(\sqrt{T_{11}} - \sqrt{T_\perp}\right)^2 \quad \text{(Equation 2)}$$

When $\lambda_{read}$ is the near infrared, e.g., 850–1000 nm, the dispersive component is dominant and Equation 1 may be approximated by $$\frac{I_{read}}{I^\circ_{read}} \; T_{ave}\sin^2\tfrac{\delta}{2} \quad \text{(Equation 3)}$$

Because there is very little dichroism in the near infrared, i.e. $T_{11} \approx T_\perp$, the average transmittance $T_{ave}$ is employed in Equation 3.

Image contrast may be defined as $$\frac{I_{1\text{-}bit}}{I_{0\text{-}bit}}.$$

The value of $I_{1\text{-}bit}$ is that of $I_{read}$ in Equations 1, 2, and 3. The value of $I_{0\text{-}bit}$ is typically on the order of $10^{-4} I^\circ_{read}$ and has been found to be due primarily to strain in the glass and scattering on the surface of the photo-dichroic layer. The contrast that can be obtained with both reading modes is depicted in the two examples reported in Table VI, infra.

In the first example a ground and polished 2 mm thick plate of exemplary composition 37 of Table I, supra, was solution ion exchanged in like manner to the samples forming the basis of FIGS. 5A, 5B, and 5C. The plate was darkened to a transmittance value of 16% at 632 nm utilizing an exposure of 40 minutes to a 2500 watt HgXe arc. The second example comprised a ground and polished 2 mm thick plate of exemplary composition 38 of Table I, supra, which had also been solution ion exchanged in accordance with method set out above for FIGS. 5A, 5B, and 5C. The plate was darkened to a transmittance of about 0.5% at 632 nm following an exposure of 3.5 hours to a 2500 watt HgXe arc. Both samples were subsequently bleached with an energy density of 5 j/cm² with a write beam at 647 nm having an intensity of 2.5 watts/cm².

TABLE VI

| | $\lambda_{read} = 632$ nm | | | | $\lambda_{read} = 850$ nm | | | | | |
|---|---|---|---|---|---|---|---|---|---|---|
| Example | $T_{11}$ | $T_\perp$ | $\tfrac{1}{4}(T_{11}-T_\perp)^2$ | Contrast | $\Delta OD_p$ | $\tfrac{\delta}{2}$ | $\sin^2\tfrac{\delta}{2}$ | $T_{ave}$ | $T_{ave}\sin\tfrac{\delta}{2}$ | Contrast |
| 37 | 0.365 | 0.158 | 0.011 | 110/1 | 0.72 | 22.6 | 0.148 | 0.40 | 0.059 | 590/1 |
| 38 | 0.022 | 0.005 | 0.0015 | 15/1 | 1.28 | 40.2 | 0.416 | 0.25 | 0.104 | 1040/1 |

| | | | | $\lambda_{read} = 900$ nm | | | |
|---|---|---|---|---|---|---|---|
| Example | $\Delta OD_p$ | $\tfrac{\delta}{2}$ | $\sin^2\tfrac{\delta}{2}$ | $T_{ave}$ | $T_{ave}\sin^2\tfrac{\delta}{2}$ | Contrast |
| 37 | 0.72 | 16.4° | 0.0797 | 0.55 | 0.0438 | 438/1 |
| 38 | 1.28 | 29.2° | 0.238 | 0.40 | 0.0952 | 952/1 |

In view of the data of Table VI, it has been concluded that greater contrasts are obtained when the dispersive term of Equation 1 is employed for read, and that the contrast obtainable with a read beam in the rear infrared increases with a darker photo-dichroic layer. A contrast of 1000:1 in a recorded spot, which corresponds to a 30 db absorption for a conventional photochromic element, is contributed from the dispersive term at 850–900 nm with a dichroic absorption difference of 6.4 db at 632 nm or 12.8 db at the wave length of the absorptive peak around 700 nm. A dichroic absorption difference, $\Delta OD_p$, of 10 db at the wavelength of the absorption peak amounts to 60°, 45°, and 30° phase shifts at wavelengths 850, 900, and 1000 nm, respectively. The large phase shift per unit value of dichroic absorption difference, i.e., $\delta/\Delta OD_p$, displayed by the inventive materials illustrates their high diffraction efficiency which recommends them for a holographic read.

As has been demonstrated above, the sensitivity of the photo-dichroic layer produced via the present invention over the intensity range of 1 watt/cm² – 10³ watts/cm² increases by a factor of 2–4, when the intensity of the write beam is increased by a factor of 10. As is manifested in FIG. 6, reasonably good contrast can be obtained at an intensity level of 72 watts/cm² with a writing energy density of 0.25 j/cm². Hence, at the intensity levels which are customarily employed in optical memory systems, e.g., 1 milliwatt/μm² or 10⁵ watts/cm², high contrast can be secured utilizing writing energy densities of less than 0.1 j/cm².

Figure 7:
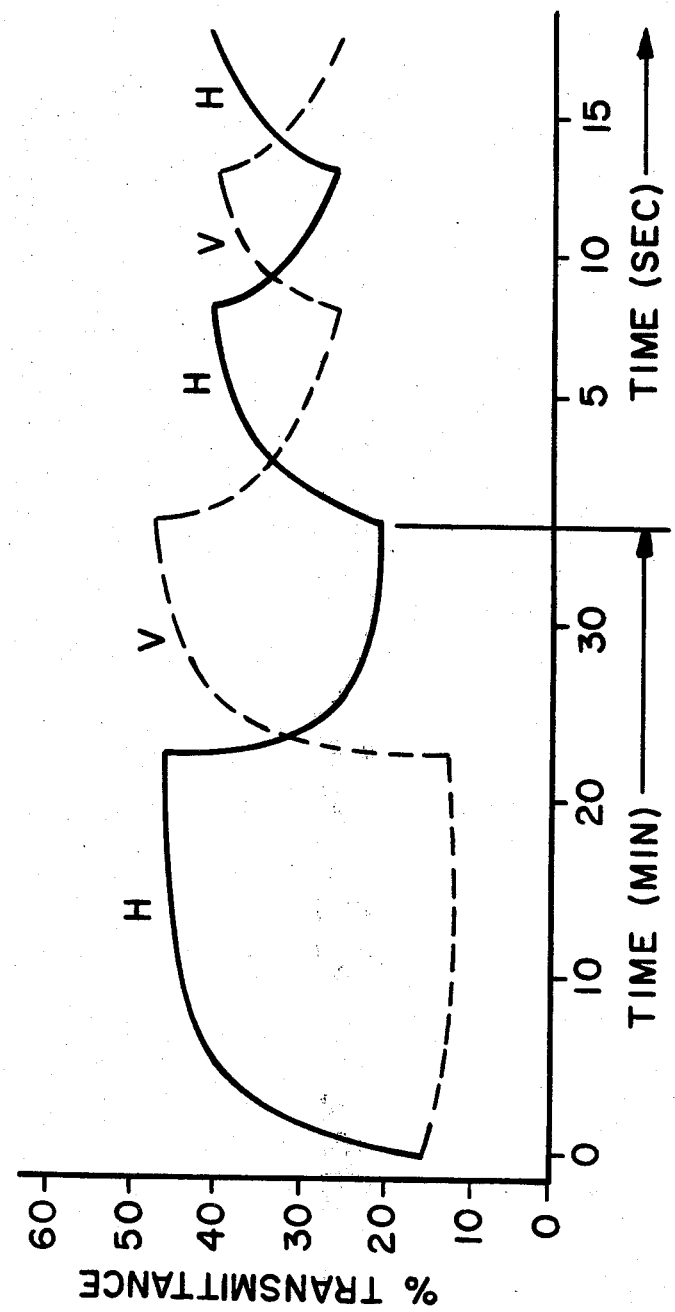
FIG. 7 graphically represents the improvement in bleaching sensitivity possible through preconditioning cycles.

It has been determined that the bleaching sensitivity of the blue colored surface layer can be improved through a few initial cycles of preconditioning. This circumstance is exhibited in FIG. 7. In a preconditioning cycle, the sample is subjected to intense polarized light at a wavelength of about 600–700 nm, e.g., 647.1 nm using a krypton gas laser and 632.8 nm utilizing a He-Ne laser, polarized in the horizontal direction. After the sample has been bleached sufficiently to create a desirable photo-dichroic effect, the polarization of the red light is switched to the vertical direction. When the preconditioning cycle, i.e., the bleaching cycle, is repeated, the required energy density to rotate the polarization of the bleached spot in the glass sample is reduced up to 100 fold, provided that the required dichroic absorption difference is ≦4 db at the absorption peak. Note in FIG. 7 that the time scale changes from minutes to seconds after the first preconditioning cycle.

A very important advantage inherent in the inventive photo-dichroic mode of recording resides in the fact that the information can be erased by re-exposing with polarized light of a different orientation. Thus, erasing is accomplished by a re-exposing the recorded spot with a different polarization of the write beam. For example, a 45° or 90° change in polarization direction will remove the image. Since a write-erase cycle is equivalent to a preconditioning cycle, an increasing number of write-erase cycles may actually increase the writing sensitivity. This is particularly true where the required contrast to read is minimal. In any event, an indefinitely large number of write-erase cycles is possible without fatigue.

Figure 3B:
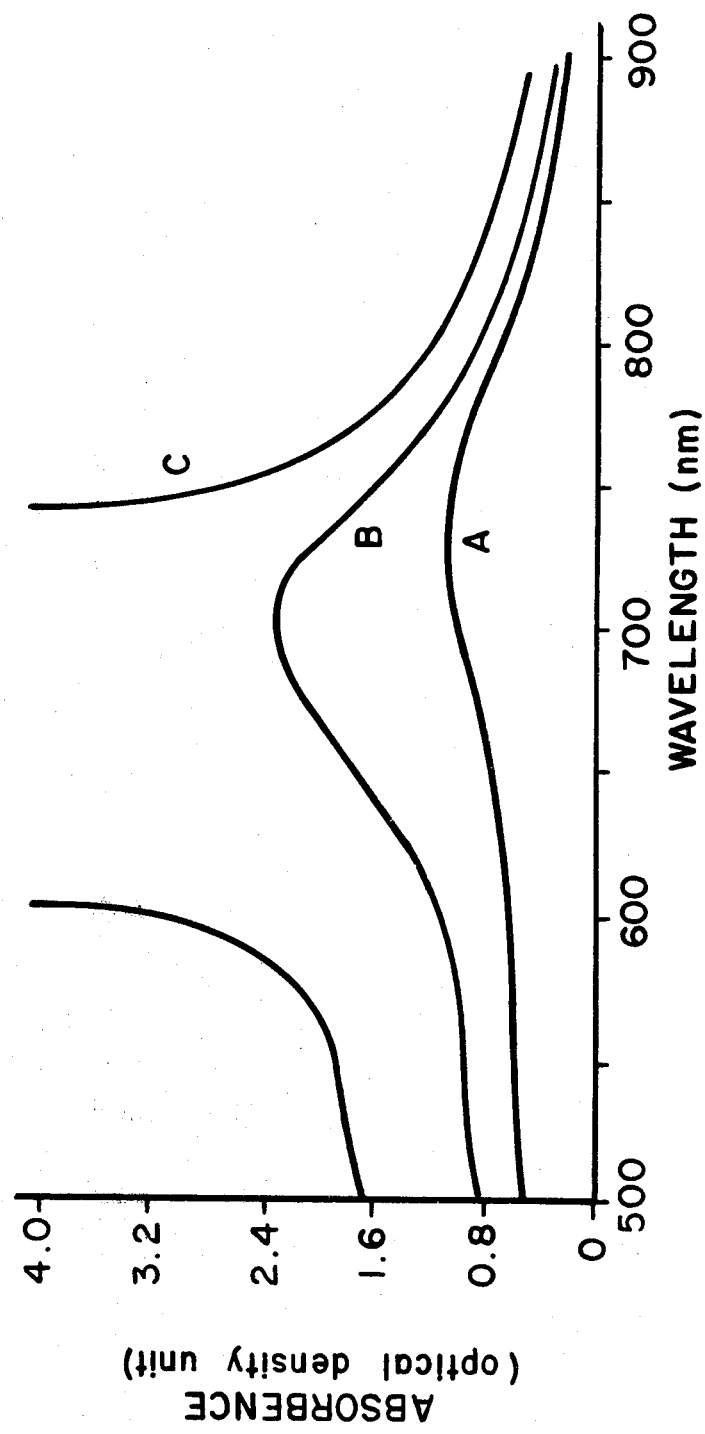
FIG. 3B graphically depicts the optical density of an inventive product.
Figure 4:
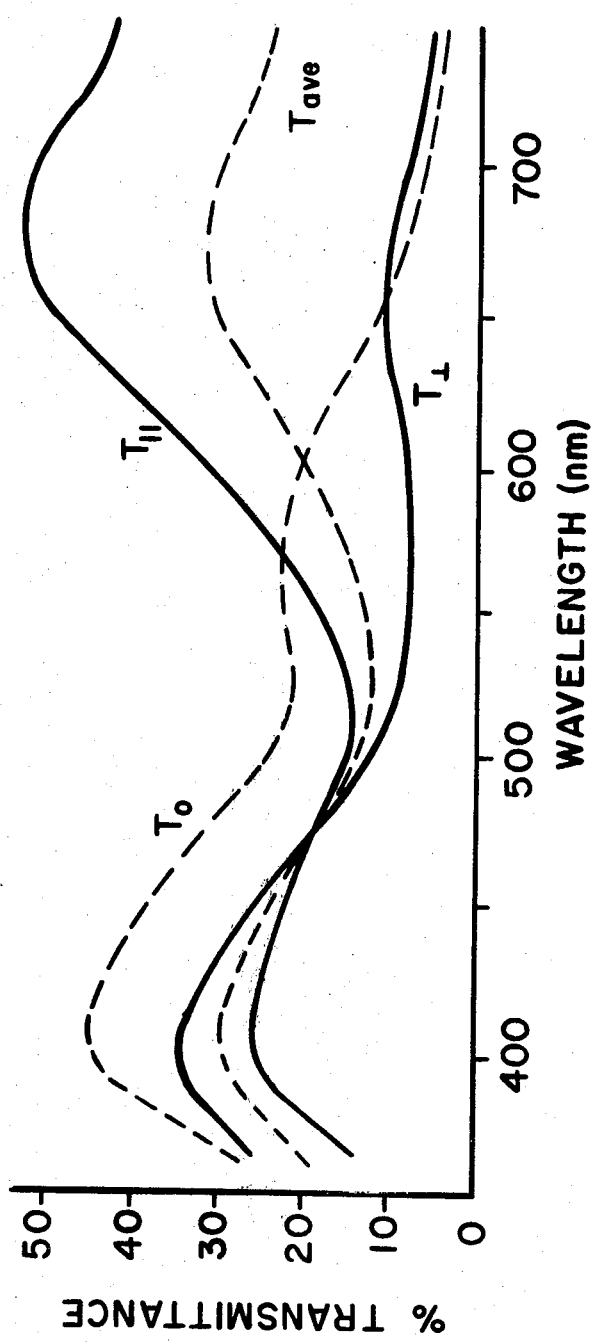
FIG. 4 graphically illustrates the transmittance spectra of an inventive product.

From FIG. 3B it can be observed that, associated with the intense dichroic absorption band at 700 nm, there exists a wavelength dependent birefringence, $n_{\parallel}-n_{\perp}$. The Kramers-Kronig Dispersion Relation indicates that the birefringence should be relatively large in the near infrared wing of the dichroic absorption band where there is little absorption. This is in good agreement with the experimental data, as is illustrated in Table VI. In holographic read and bit-by-bit extinction read processes, the contrast may be contributed solely from the birefringence. And, inasmuch as there is little absorption in that portion of the spectrum between 850–1100 nm, the photo-anisotropic image can be read essentially non-destructively, i.e., for a very large number of times without fatigue.

Because of the intensity dependence of the writing energy density required, a finite but significant number of readings is possible with a read beam of lower intensity where the read and write beams have the same wavelength. Another very important factor is that the recorded information is stable indefinitely under normal ambient lighting conditions.

It is not necessary for the photo-dichroic layer to be of a thickness equivalent to the full depth of the ion exchanged layer. The ion exchanged, silver-containing, photosensitive layer is customarily essentially colorless before exposure to ultraviolet radiation. When exposed to ultraviolet radiation, a fraction or the full thickness of the photosensitive layer can be darkened. The depth of the darkened layer is a function of the energy density and the wavelength of the impinging ultraviolet radiation. The addition of elements capable of absorbing ultraviolet radiation, e.g., lead and cerium, tends to decrease the depth of the darened layer at constant energy density or, as a corollary thereto, to require an increase in the ultraviolet intensity to achieve a desired depth of penetration. Photo-dichroism is restricted to the ultraviolet darkened sublayer since, prior to ultraviolet darkening, the colorless photosensitive layer is not affected by exposure to red light.

The photo-dichroic layer, i.e., the ultraviolet-darkened portion of the photosensitive layer, has an absorption band at 340 nm in addition to absorption in the ultraviolet interval of the radiation spectrum resulting from the base glass constituents. Because of that factor, the colorless photosensitive layer beneath the photo-dichroic layer is protected from exposure to ultraviolet radiation unless the intensity thereof exceeds a threshold value, the magnitude of which increases with increasing optical density of the photo-dichroic layer. As a result, the thickness of a photo-dichroic layer remains substantially constant at any fraction of the full depth of the photosensitive layer under ambient lighting conditions. Consequently, it is completely practical to prepare a photo-dichroic layer of, for example, less than 10 microns on top of a thicker photosensitive layer say of 100 microns or more. By such means it is possible to fabricate photographic patterns with varying depths of photo-dichroic layer in the surfaces of the solution ion exchanged glasses of the instant invention.

For applications which make use of the photo-dichroic effect, the thickness of the operative layer can be delimited through control of the ultraviolet exposure. To a large extent, independent variation of the optical density and the thickness of the photo-dichroic layer can be achieved via regulation of the wavelength of darkening radiation selected over the spectral range from X-rays to green light, the intensity, and the time of exposure to darkening radiation, along with control of the base glass composition, the ingredients of the ion exchange solution, and the process parameters of the ion exchange reaction.

In summary, the photo-dichroic layers of the instant invention do not appear to show further darkening under ambient (room) lighting conditions for an indefinite period of time. Moreover, the ultraviolet darkened specimens demonstrate no apparent thermal fading at room temperatures (20°–25° C.), or even at elevated temperatures up to the thermal decomposition temperature of the hydrated glass.

Because of those features, a range of values of optical density (OD) can be achieved in a variety of thicknesses of the ion exchange layer ranging from less than 10 microns to more than 200 microns. Such are of particular utility for optical recording and direct reading applications.

It has been found that the magnitude of the birefringence in the near infrared (IR) portion of the spectrum, i.e., from about 850–1000 nm, increases with increasing dichroism in the red (R) portion of the spectrum, i.e., from about 600–750 nm. Since there is but little absorption in the near infrared portion of the spectrum, this birefringence can be utilized for non-destructive reading. Thus, the most preferred wavelength of light to read (λread) is in the near infrared. To obtain a maximum contrast, i.e., $$\frac{I_{1\text{-}bit}}{I_{0\text{-}bit}},$$

with a given writing energy density, the value of $T_{ave}\text{-}Sin^2\delta/2$ should be maximized. Since the phase shift $\delta$ is linearly proportional to the dichroic absorption difference $\Delta OD_p$ at the absorption peak, there exists an optimum optical density at the absorption peak, viz., $OD_p$, to obtain a maximum birefringence contrast with a given writing energy density. This optimum value is generally greater than 5 db. Such an optical density may be secured in an ion exchanged layer having a thickness greater than about 5 microns.

The optical density of the photo-dichroic layer may be closely regulated to a desired value within the range of up to about two optical density units at the peak absorption near 700 nm per 10 microns thickness, that is, $OD_p=2$ db/micron thickness, by controlling the variables cited above such as, for example, the energy density and the wavelength employed in the darkening radiation. The phase shifts due to birefringence in the near infrared wing of the absorption band are typically 60°, 45°, and 30° per unit value of $\Delta OD_p$ at 850 nm, 900 nm, and 1000 nm, respectively. (In optical density units, 1 unit = 10 db.) Such capabilities recommend the products of the instant invention for use as holographic optical memory materials. Moreover, the inventive products are no less attractive as materials for bit-by-bit optical memory systems since shapes of any size and geometry can be readily fabricated.

Most of the optical memory materials known to the present time, e.g., single crystals, are severely limited in size. Because of that factor, a large, randomly accessible memory relies solely upon a high storage density. Since the diffraction limited bit size is 1 micron, the size of the bit for optical memory materials must be limited to 1 micron.

In contrast, when there is no restriction on the physical dimensions of the memory material, larger bit sizes become possible. Thus, bit sizes up to about 5 microns have been determined to be especially advantageous for the following reasons.

It is well-known that the optimized F number of a suitable objective lens is linearly proportional to the diameter of the spot size, and that the area on a recording material which is accessible through beam deflection with an F-4 lens is at least 4×4 times that for an F-1 lens. Inasmuch as the required spacing between the adjacent bits is the same for 1 micron bits as for larger bit sizes, the number of bits randomly accessible is considerably greater for a system employing an F-4 lens than one with an F-1 lens. Moreover, a diffraction limited F-1 lens is expensive and mass production of such lenses is presently non-existent.

The $e^{-2}$ spot size diameter using a Gaussian beam at 632 nm is 1.6, 2.3, 3.2, 4.0, 4.6, and 5.1 microns for a thickness of recording material of 5, 10, 20, 30, 40, and 50 microns, respectively. The optimized F numbers for these thicknesses are 1.4, 2, 2.8, 3.5, 4.0, and 4.5, respectively.

As is illustrated in Tables IIIA-F, the most preferred ion exchange solutions are acidified $AgNO_3$ solutions having a mole ratio $[Ag^+]:[H^+]$ within the interval of about 0.37–1.85. Furthermore, the most preferred temperatures for conducting the ion exchange range between about 300°–320° C. The duration of the ion exchange reaction is self-evidently determined by the thickness desired of the ion exchanged-hydrated layer along with the rate of penetration of $Ag^+$ ions into the glass, this latter factor being dependent upon glass composition and the composition of the exchange solution, as well as the temperature of the exchange. For example, the addition of $LiNO_3$ to the ion exchange solution seems to reduce the rate at which $Ag^+$ ions migrate into the glass body. Additions of $NaNO_3$, $KNO_3$, and/or $Zn(NO_3)_2$ to the ion exchange solution, however, do not appear to cause a similar effect.

It has been observed that the ion exchanged-hydrated surface layer exhibits a tendency to crack and/or spall off the body of the glass samples because of a mismatch in thermal expansion therebetween. However, the addition of $LiNO_3$ to the ion exchange solution decreases the water concentration in the glass with a concomitant reduction in the thermal expansion of the ion exchanged-hydrated surface layer, thereby reducing the degree of expansion mismatch between the surface layer and interior portion of the glass samples. Thus, the inclusion of 200 grams of $LiNO_3$/liter of ion exchange solution completely eliminated the cracking and spalling of the hydrated surface layer and, at the same time, slowed the rate of $Ag^+$ ion-for-$Na^+$ ion exchange by a factor of three to four. This is not necessarily an undesirable phenomenon. For example, when the solution ion exchanged product is to be employed as a bit-by-bit optical memory material, the desirable thickness of the photo-dichroic layer is less than about 50 microns. A slower rate of ion exchange is helpful in reproducing more accurately the thickness of a thin solution ion exchanged layer, i.e., the photosensitive layer.

It has been observed that a relatively brief soaking, e.g., no more than several hours, in the acidic ion exchange solution containing $LiNO_3$ at an elevated temperature frequently yields a surface on the ground and polished specimen having an orange peel-like appearance. The explanation for that phenomenon is believed to lie in a preferential dissolution of silica along the microscratches left from the grinding and polishing operations. The formation of this unwanted surface effect can be avoided via saturating the ion exchange solution with silica as, for example, through the addition of 1 gram or more of silica gel/liter of the ion exchange solution.

I claim:

1. A photosensitive colored glass article exhibiting alterable photo-anisotropic effects consisting of a body portion and an integral hydrated surface layer of a thickness about 1–500 microns having Ag-AgCl-containing crystals therein, at least a portion of which exhibits photo-dichroic and birefringent properties when exposed to colored, linearly polarized bleaching light, said body portion consisting essentially, in mole percent on the oxide basis, of about 70–82% $SiO_2$, 10–17%

$Na_2O$ and/or $K_2O$, 5-15% ZnO, 0.5-5% $Al_2O_3$, and 0.1-3% Cl, said surface layer containing about 1-8% by weight $H_2O$ and about 2-20% by weight Ag, the proportion of $Na^+$ and/or $K^+$ ions in said surface layer being less with a corresponding increase in $Ag^+$ ions, and the Ag portion of said crystals is present as a layer on the surface of the crystals and/or is contained within said crystals.

2. A photosensitive optical information storage medium for storing optical information utilizing photo-anisotropic effects comprising a photosensitive colored glass article exhibiting alterable photo-anisotropic effects consisting of a body portion and an integral hydrated surface layer of a thickness of about 1-500 microns having Ag-AgCl-containing crystals therein, at least a portion of which exhibits photo-dichroic and birefringent properties when exposed to colored, linearly polarized bleaching light, said body portion consisting essentially, in mole percent on the oxide basis, of about 70-82% $SiO_2$, 10-17% $Na_2O$ and/or $K_2O$, 5-15% ZnO, 0.5-5% $Al_2O_3$, and 0.1-3% Cl, said surface layer containing about 1-8% by weight $H_2O$ and about 2-20% by weight Ag, the proportion of $Na^+$ and/or $K^+$ ions in said surface layer being less with a corresponding increase in $Ag^+$ ions, and the Ag portion of said crystals is present as a layer on the surface of the crystals and/or is contained within said crystals.

* * * * *